United States Patent
Davis

(10) Patent No.: US 8,126,840 B2
(45) Date of Patent: Feb. 28, 2012

(54) LUBRICATION PROGRAM MANAGEMENT SYSTEM AND METHODS

(75) Inventor: Adam M. Davis, Tulsa, OK (US)

(73) Assignee: Noria Corporation, Tulsa, OK (US)

( * ) Notice: Subject to any disclaimer, the term of this patent is extended or adjusted under 35 U.S.C. 154(b) by 942 days.

(21) Appl. No.: 11/876,544

(22) Filed: Oct. 22, 2007

(65) Prior Publication Data

US 2009/0106227 A1  Apr. 23, 2009

(51) Int. Cl.
 *G06F 17/00* (2006.01)
 *G06F 9/46* (2006.01)
(52) U.S. Cl. ........................ 707/608; 718/101
(58) Field of Classification Search .................. 707/951
 See application file for complete search history.

(56) References Cited

U.S. PATENT DOCUMENTS

| | | | |
|---|---|---|---|
| 4,827,423 A | 5/1989 | Beasley et al. | |
| 4,943,919 A | 7/1990 | Aslin et al. | |
| 5,216,612 A | 6/1993 | Cornett et al. | |
| 5,552,987 A | 9/1996 | Barger et al. | |
| 5,856,931 A | 1/1999 | McCasland | |
| 5,884,317 A * | 3/1999 | Cline et al. | 1/1 |
| 6,006,171 A | 12/1999 | Vines et al. | |
| 6,036,098 A | 3/2000 | Goldman et al. | |
| 6,042,383 A | 3/2000 | Herron | |
| 6,442,459 B1 * | 8/2002 | Sinex | 701/29 |
| 6,580,982 B2 * | 6/2003 | Sinex | 701/29 |
| 6,594,621 B1 | 7/2003 | Meeker | |
| 6,609,051 B2 | 8/2003 | Flechter et al. | |
| 6,651,034 B1 | 11/2003 | Hedlund et al. | |
| 6,665,581 B2 | 12/2003 | Nishida et al. | |
| 6,704,688 B2 | 3/2004 | Aslam et al. | |
| 6,742,000 B1 | 5/2004 | Fantasia et al. | |
| 6,772,098 B1 | 8/2004 | Stark et al. | |
| 6,842,760 B1 | 1/2005 | Dorgan et al. | |
| 6,873,260 B2 | 3/2005 | Lancos et al. | |
| 6,901,318 B1 | 5/2005 | Morronigiello et al. | |
| 6,952,680 B1 | 10/2005 | Melby et al. | |
| 6,955,100 B1 | 10/2005 | Barich et al. | |
| 6,957,206 B2 | 10/2005 | Nolan | |
| 7,013,239 B2 | 3/2006 | Hedlund et al. | |
| 7,027,954 B2 | 4/2006 | Mets et al. | |
| 7,062,455 B1 | 6/2006 | Tobey | |
| 7,088,378 B1 | 8/2006 | Engstrom et al. | |
| 7,104,437 B2 | 9/2006 | Pradhan et al. | |

(Continued)

*Primary Examiner* — Tarek Chbouki
(74) *Attorney, Agent, or Firm* — Dunlap Codding, P.C.

(57) ABSTRACT

A system for scheduling a plurality of selected maintenance tasks. The system comprises one or more storage media and a processor. The one or more storage media store data indicative of a plurality of maintenance points, a plurality of task templates, and a plurality of maintenance task definitions as associations between maintenance points and task templates. At least one maintenance point has a plurality of maintenance point parameters and is associated with at least one task template having a plurality of task parameters, such that upon accessing at least one of the maintenance task definitions, such maintenance task definition is dynamically generated from the plurality of maintenance point parameters of the at least one maintenance point and from the plurality of task parameters of the at least one task template. The processor selectively applies one or more queries to the stored data to generate an assignment including one or more selected maintenance tasks. The one or more queries have a plurality of filter criteria and a plurality of logical relationships defined between the filter criteria to selectively include maintenance task definitions matching the one or more queries and exclude maintenance task definitions not matching the one or more queries. The system further comprises at least one means for outputting the generated assignment.

5 Claims, 28 Drawing Sheets

U.S. PATENT DOCUMENTS

| | | |
|---|---|---|
| 7,143,007 B2 | 11/2006 | Long et al. |
| 7,152,068 B2 | 12/2006 | Emery et al. |
| 7,156,305 B2 | 1/2007 | Swan et al. |
| 7,162,391 B2 | 1/2007 | Knepler |
| 7,177,706 B2 | 2/2007 | Schweizer et al. |
| 7,181,370 B2 | 2/2007 | Furem et al. |
| 7,181,454 B1 | 2/2007 | McClamroch et al. |
| 7,209,859 B2 | 4/2007 | Zeif |
| 7,225,193 B2 | 5/2007 | Mets et al. |
| 2001/0039594 A1* | 11/2001 | Park et al. .................... 709/311 |
| 2002/0124064 A1* | 9/2002 | Epstein et al. ................ 709/221 |
| 2003/0055666 A1 | 3/2003 | Roddy et al. |
| 2003/0061008 A1 | 3/2003 | Smith, Jr. et al. |
| 2003/0135495 A1* | 7/2003 | Vagnozzi ........................ 707/3 |
| 2003/0172075 A1* | 9/2003 | Reisman ........................ 707/10 |
| 2004/0078373 A1* | 4/2004 | Ghoneimy et al. ............ 707/10 |
| 2004/0176929 A1 | 9/2004 | Joubert et al. |
| 2005/0027662 A1* | 2/2005 | Mayo et al. ................... 705/406 |
| 2007/0067678 A1 | 3/2007 | Hosek et al. |
| 2007/0124009 A1 | 5/2007 | Bradley et al. |
| 2007/0168050 A1 | 7/2007 | Chambers et al. |
| 2009/0064160 A1* | 3/2009 | Larson et al. ................. 718/104 |

\* cited by examiner

Demo Plant
Gearbox Gear Case Level & Oil Quality Inspection

| Estimated Time: | 2 Minutes | Op State Required: | None (Any state allowed) | Scheduling Type: | Interval: Weekly |
|---|---|---|---|---|---|
| Physical Location: | loading dock | | | | |
| Machine: | Track 1 Unload Elevator: Gearbox: Gear Case | | | | |
| Manufacturer: | Falk | | | Model: | 2050 FC/FZ |
| CMMS: | U (utilities): U-FH (coal handling): U-FH-T1EL | | | | |
| Toolkits: | | | | | |
| Sample Bottle | | | Laser Pointer | | |
| Rags & Misc. Tools | | | | | |

Purpose:
To verify that the oil is being maintained at the proper level and inspect for visually obvious oil related problems such as leakage, gross contamination by moisture, particles or aeration, lubricant degradation and foaming.

Scope:
Static oil filled applications in which a column sightglass is permanently installed as the primary in service oil level and quality inspection point. This procedure assumes that the sightglass or the gear case itself has been marked with both the running (hot) and down (cold) oil levels.

Summary:
Identify the column sightglass. Check its condition and clean it. Check the condition of the gear case. Inspect the oil quality by all visual means and the level, including the use of a flashlight and laser pointer against a neutral background. Collect tools, clean up, and return the equipment to its original state.

Detailed Steps

1. Locate the column sightglass on the gear case. Ensure that it is in proper condition for the execution of this procedure.
   - Observable Symptom: Cannot locate key hardware for the completion of the procedure.
     - Possible Cause: Hardware is hidden behind guards or covers or is not in place.
       - Resolution steps:
         1. Note that (indicate specifically which) hardware is either not available with the equipment running or not in place. The actual problem should be identified on next shutdown & resolved if possible.
         2. Note that no further attempts should be made to schedule or complete this procedure until this condition is rectified. Replace with down time procedures.
         3. STOP. Do not attempt to complete the procedure. Return the equipment to the condition it was in before work started.
         4. Note this as the reason the procedure was not completed.
   - Observable Symptom: The hot (running) oil level and possibly the down oil level are not marked

*Fig. 6A*

Demo Plant
Gearbox Gear Case Level & Oil Quality Inspection at the level indicator.
- Possible Cause: The proper oil level cannot be reliably determined.
  - Resolution steps:
    1. Determine the correctness of the level to the best of your ability and experience.
    2. Note that the proper oil level for this gear case should be marked at the next overhaul.
    3. Note that the proper level could not be determined in the field and that this gear case may be operating at an incorrect oil level.
    4. Otherwise continue with the procedure as normal.
2. Inspect the overall condition of the gear case. Check for mechanical integrity problems and the build up of dirt and debris at potential leakage points.
   - Observable Symptom: Oil is visibly leaking from the gear case.
     - Possible Cause: The oil seal at the point at which leakage is seen is not functional. Oil level will not be effectively maintained without intervention.
       - Resolution steps:
         1. Attempt to determine if an shaft seal, gasket or hardware connection is responsible for the leak as well as an approximate description of the leakage rate and note the leak as precisely as possible.
         2. Note that the interval between top up inspections should be reduced until an overhaul or leak correction can be made.
         3. Position a suitable waste oil container or other leak absorbing/containing device to collect the leaking fluid and leave in place.
         4. Otherwise continue with the procedure as normal.
3. Using a clean, lint-free cloth, wipe any soil, deposits and debris from the column of the sightglass (so the level can be accurately determined).
4. Inspect the current level of the oil from the gear case's level indicator. Use a flashlight to avoid being fooled by staining of the glass and compare this to the proper level for the current operating state of the gear case.
   - Observable Symptom: The level of the oil is HIGHER than the fill mark appropriate to the current operating state of the gear case.
     - Possible Cause: The gear case has ingested a foreign fluid, either from the process or from precipitation or from cleaning sprays.
       - Resolution steps:
         1. Position a sample bottle at the drain port.
         2. Remove the drain plug from the gear case to drain some oil from the BOTTOM of the gear case into a sample bottle, reinstall the drain plug and inspect the composition of the fluid in the sample bottle. Oil "floats" on top of water. If the ingested significant amounts of water it will appear here.
         3. If the sampled fluid appears to be free water or an oil-water emulsion (a milky appearance), then this is in fact the likely cause.
     - If resolved:
       1. Note that a follow up procedure to correct gross water contamination is needed.
       2. Note that this gear case should be monitored more closely with oil analysis and/or be inspected more frequently from the level gauge with careful attention to increases in "oil" level (water is likely the cause of such volume increases).

*Fig. 6B*

Demo Plant
Gearbox Gear Case Level & Oil Quality Inspection

3. Otherwise continue with the procedure as normal.
- If unresolved:
  1. If the sampled fluid does not show these signs, then this is not the likely cause.
  2. Attempt next possible resolution.
- Possible Cause: Too much oil was previously added.
  - Resolution steps:
    1. Note that a follow up procedure to correct the high oil level is needed.
    2. Note that there is likely a need for additional training on top up practices.
    3. Note that this gear case should be sampled for possible lubricant cross contamination (anyone who would overfill may also have used the wrong lubricant) or simply scheduled for a drain & fill as soon as possible.
    4. Otherwise continue with the procedure as normal.
  o Observable Symptom: The level of the oil is lower than the fill mark appropriate to the current operating state of the gear case.
    - Possible Cause: The oil level needs to be adjusted.
      - Resolution steps:
        1. Note that a follow up procedure to correct the low oil level is needed (or if the Track 1 Unload Elevator is not currently running, a recheck of the level when next operating).
        2. Note that this gear case should be monitored for possible leakage and/or an improperly marked cold (not running) oil level.
        3. Otherwise continue with the procedure as normal.
5. Inspect the overall condition of the oil from the level indicator. Take note of properties such as its color, the degree of foaminess, and visible free water or mayonnaise-like emulsions.
  o Observable Symptom: The oil has visible free water in it or has a milky appearance (indicative of emulsified water- like mayonnaise).
    - Possible Cause: The gear case had become contaminated with water in large quantities
      - Resolution steps:
        1. Note that it is high likelihood of gross water contamination for engineering to investigate further.
        2. Note that this gear case should be monitored more closely with oil analysis and/or be inspected more frequently from the level gauge with careful attention to increases in "oil" level (water is likely the cause of such volume increases).
        3. Otherwise continue with the procedure as normal.
  o Observable Symptom: The oil has visible air bubbles or foam at the surface.
    - Possible Cause: The oil is foaming due to operational, lubricant selection, or lubricant degradation issues.
      - Resolution steps:
        1. Note the foaming problem for engineering to investigate further.
        2. Otherwise continue with the procedure as normal.
  o Observable Symptom: The oil is dark in color.
    - Possible Cause: The oil may have oxidized (color is a weak indicator of oil condition, but a worthwhile warning sign).
      - Resolution steps:
        1. Note the possible oxidation problem for engineering to investigate further.
        2. Otherwise continue with the procedure as normal.

*Fig. 6C*

Demo Plant
Gearbox Gear Case Level & Oil Quality Inspection

6. Using a laser pointer, direct a beam of light through the oil onto a white, neutral background behind the column sightglass. Note the degree of dispersion of the light on the background.
    o Observable Symptom: The oil does not transmit light freely.
        ▪ Possible Cause: The oil has entrained air (tiny bubbles) or severe particulate contamination that is blocking the light.
            ▪ Resolution steps:
                1. Note the possibility of air or particle contamination for engineering to investigate further.
                2. Otherwise continue with the procedure as normal.
7. Return any hardware removed or modified for non corrective reasons to their proper state so that the Track 1 Unload Elevator can again be used by operations.
8. Wipe up or otherwise contain any spilt lubricant or other dirt or debris created during this procedure. Collect all tools, supplies and materials from the area of the gear case.

©This information is supplied for the exclusive use of the company/facility listed in the document header and may not be copied, or distributed either electronically or in hardcopy to outside parties without the express written consent of Noria Corporation. The procedures and information contained herein is offered without warranty or liability as to its completeness or accuracy. Noria Corporation accepts no liability for any decisions or events that occur as a direct or indirect result of this procedure or information contained herein.

*Fig. 6D*

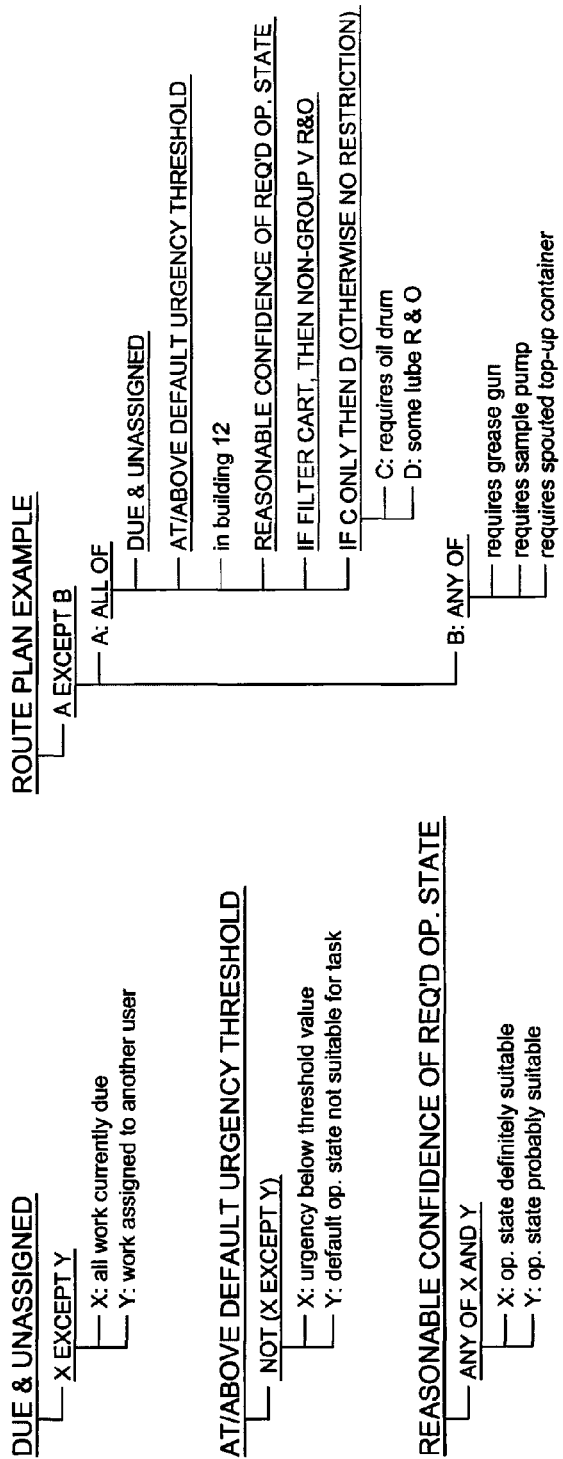
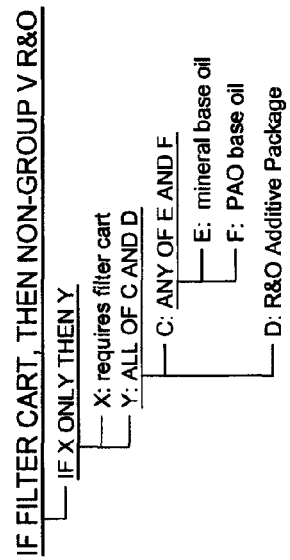
Fig. 11
Fig. 10

 Assignment for John Lubetech
Demo Plant

| Technician: | John Lubetech | Estimated Time: | 8.5 Hours |
|---|---|---|---|
| Material List: | | | |
| Filter cart (NoriaSyn 100) | | Clean Oil in Drum (NoriaSyn 100) | |
| Sample Bottle | | Waste Fluid Container | |
| Replacement Parts | | Misc. Hardware and Fittings | |
| Rags & Misc. Tools | | | |

| Locations: |
|---|
| crush building: main floor: fan room |
| crush building: main floor: pulverizer room |
| crush building: second floor |
| crush building: main floor: crush room |

Location: crush building: main floor: fan room

Pulverized Coal Feed 1 Fan B: Motor: Bearing Housing

1. Motor: Sealed Motor Bearing Housing Partial Gross Water Gravity Bleed

1. Identify the level gauge and the drain port. Check their condition and clean them. Check the condition of the bearing housing.
   2. Position a waste oil container at the drain port and, taking all possible precautions against contamination, drain sufficient fluid from the BOTTOM of the bearing housing to achieve the proper running (hot) level marked by briefly removing and then replacing the drain plug. Note the volume and composition of fluid drained.
   3. Note that this bearing housing must still have a complete gross water bleed or complete drain and fill performed at the earliest possible opportunity.
   4. Collect tools, clean up, and return the equipment to its original state.

Pulverized Coal Feed 4 Fan B: Motor: Bearing Housing

2. Motor: Sealed Motor Bearing Housing Overfill Gravity Drain Down

1. Identify the level gauge and the drain port. Check their condition and clean them. Check the condition of the bearing housing.
   2. Position a waste oil container at the drain port, and taking all possible precautions against contamination, drain sufficient lubricant from the BOTTOM of the bearing housing to

*Fig. 13A*

Assignment for John Lubetech
Demo Plant achieve the proper running (hot) level marked by briefly removing and then replacing the drain plug.
3. Re-verify that the level is now appropriate and adjust if necessary. Note the approximate volume of oil drained.
4. Collect tools, clean up, and return the equipment to its original state.

Pulverized Coal Feed 6 Fan B: Motor: Bearing Housing

3. Motor: Sealed Motor Bearing Housing Overfill Gravity Drain Down

1. Identify the level gauge and the drain port. Check their condition and clean them. Check the condition of the bearing housing.
2. Position a waste oil container at the drain port, and taking all possible precautions against contamination, drain sufficient lubricant from the BOTTOM of the bearing housing to achieve the proper running (hot) level marked by briefly removing and then replacing the drain plug.
3. Re-verify that the level is now appropriate and adjust if necessary. Note the approximate volume of oil drained.
4. Collect tools, clean up, and return the equipment to its original state.

Pulverized Coal Feed 4 Fan B: Fan: Bearing Housing

4. Fan: Sealed Fan Bearing Housing Partial Gross Water Gravity Bleed

1. Identify the level gauge and the drain port. Check their condition and clean them. Check the condition of the bearing housing.
2. Position a waste oil container at the drain port and, taking all possible precautions against contamination, drain sufficient fluid from the BOTTOM of the bearing housing to achieve the proper running (hot) level marked by briefly removing and then replacing the drain plug. Note the volume and composition of fluid drained.
3. Note that this bearing housing must still have a complete gross water bleed or complete drain and fill performed at the earliest possible opportunity.
4. Collect tools, clean up, and return the equipment to its original state.

Pulverized Coal Feed 3 Fan A: Fan: Bearing Housing

5. Fan: Sealed Fan Bearing Housing Top Up with NoriaSyn 100 via Filter Cart

1. Identify the level gauge and the fill port. Check their condition and clean them. Check the

*Fig. 13B*

 Assignment for John Lubetech
Demo Plant condition of the bearing housing.
2. Position the filter cart (flow rate 0.06 gpm; dedicated to NoriaSyn 100) within reach of fill port and connect to power supply.
3. Taking all possible precautions against contamination, connect the suction line of the filter cart to the fresh oil drum.
4. Taking all possible precautions against contamination, connect the discharge line of the filter cart to the fill port of the bearing housing.
5. Configure the filter cart to NOT bypass the filter. Observing the bearing housing level indicator, turn the filter cart on until the level reaches the mark matching the current operating state.
6. Taking all possible precautions against contamination, disconnect both connections to the filter cart and replace all caps. Stow the filter cart for next use.
7. Collect tools, clean up, and return the equipment to its original state.

Pulverized Coal Feed 3 Fan B: Fan: Bearing Housing

6. Fan: Sealed Fan Bearing Housing Top Up with NoriaSyn 100 via Filter Cart

1. Identify the level gauge and the fill port. Check their condition and clean them. Check the condition of the bearing housing.
2. Position the filter cart (flow rate 0.06 gpm; dedicated to NoriaSyn 100) within reach of fill port and connect to power supply.
3. Taking all possible precautions against contamination, connect the suction line of the filter cart to the fresh oil drum.
4. Taking all possible precautions against contamination, connect the discharge line of the filter cart to the fill port of the bearing housing.
5. Configure the filter cart to NOT bypass the filter. Observing the bearing housing level indicator, turn the filter cart on until the level reaches the mark matching the current operating state.
6. Taking all possible precautions against contamination, disconnect both connections to the filter cart and replace all caps. Stow the filter cart for next use.
7. Collect tools, clean up, and return the equipment to its original state.

Pulverized Coal Feed 6 Fan B: Fan: Bearing Housing

7. Fan: Sealed Fan Bearing Housing Top Up with NoriaSyn 100 via Filter Cart

1. Identify the level gauge and the fill port. Check their condition and clean them. Check the condition of the bearing housing.
2. Position the filter cart (flow rate 0.06 gpm; dedicated to NoriaSyn 100) within reach of fill

*Fig. 13C*

 Assignment for John Lubetech
Demo Plant port and connect to power supply.
3. Taking all possible precautions against contamination, connect the suction line of the filter cart to the fresh oil drum.
4. Taking all possible precautions against contamination, connect the discharge line of the filter cart to the fill port of the bearing housing.
5. Configure the filter cart to NOT bypass the filter. Observing the bearing housing level indicator, turn the filter cart on until the level reaches the mark matching the current operating state.
6. Taking all possible precautions against contamination, disconnect both connections to the filter cart and replace all caps. Stow the filter cart for next use.
7. Collect tools, clean up, and return the equipment to its original state.

Pulverized Coal Feed 1 Fan A: Fan: Bearing Housing

8. Fan: Sealed Fan Bearing Housing Temporary Offline Filtration via Filter Cart (0.06 gpm, NoriaSyn 100)

1. Identify the level gauge and the drain and fill ports. Check their condition and clean them. Check the condition of the bearing housing.
2. Confirm the flow of the filter cart can be controlled to below 0.06 gpm. Position it within reach of drain and fill ports and connect to power supply.
3. Taking all possible precautions against contamination, connect the suction line of the filter cart to the drain port.
4. Taking all possible precautions against contamination, connect the discharge line of the filter cart to the fill port.
5. Set valves to engage the filter and open the flow control valve (if equipped). Turn on the cart, confirm flow and adjust rate to below 0.06 gpm (if equipped). Check for leakage.
6. Decontaminate the oil by running the portable device for a sufficient amount of time to turn the oil over at least 10 times (see full document). Check for proper operation every 10-15 minutes. Turn off the cart after the proper time has elapsed.
7. Taking all possible precautions against contamination, disconnect both connections to the filter cart and replace all caps. Stow the filter cart for next use.
8. Collect tools, clean up, and return the equipment to its original state.

Pulverized Coal Feed 2 Fan A: Fan: Bearing Housing

9. Fan: Sealed Fan Bearing Housing Temporary Offline Filtration via Filter Cart (0.06 gpm, NoriaSyn 100)

1. Identify the level gauge and the drain and fill ports. Check their condition and clean them.

*Fig. 13D*

Assignment for John Lubetech
Demo Plant

Check the condition of the bearing housing.
2. Confirm the flow of the filter cart can be controlled to below 0.06 gpm. Position it within reach of drain and fill ports and connect to power supply.
3. Taking all possible precautions against contamination, connect the suction line of the filter cart to the drain port.
4. Taking all possible precautions against contamination, connect the discharge line of the filter cart to the fill port.
5. Set valves to engage the filter and open the flow control valve (if equipped). Turn on the cart, confirm flow and adjust rate to below 0.06 gpm (if equipped). Check for leakage.
6. Decontaminate the oil by running the portable device for a sufficient amount of time to turn the oil over at least 10 times (see full document). Check for proper operation every 10-15 minutes. Turn off the cart after the proper time has elapsed.
7. Taking all possible precautions against contamination, disconnect both connections to the filter cart and replace all caps. Stow the filter cart for next use.
8. Collect tools, clean up, and return the equipment to its original state.

Pulverized Coal Feed 5 Fan A: Fan: Bearing Housing

10. Fan: Sealed Fan Bearing Housing Temporary Offline Filtration via Filter Cart (0.06 gpm, NoriaSyn 100)

1. Identify the level gauge and the drain and fill ports. Check their condition and clean them. Check the condition of the bearing housing.
2. Confirm the flow of the filter cart can be controlled to below 0.06 gpm. Position it within reach of drain and fill ports and connect to power supply.
3. Taking all possible precautions against contamination, connect the suction line of the filter cart to the drain port.
4. Taking all possible precautions against contamination, connect the discharge line of the filter cart to the fill port.
5. Set valves to engage the filter and open the flow control valve (if equipped). Turn on the cart, confirm flow and adjust rate to below 0.06 gpm (if equipped). Check for leakage.
6. Decontaminate the oil by running the portable device for a sufficient amount of time to turn the oil over at least 10 times (see full document). Check for proper operation every 10-15 minutes. Turn off the cart after the proper time has elapsed.
7. Taking all possible precautions against contamination, disconnect both connections to the filter cart and replace all caps. Stow the filter cart for next use.
8. Collect tools, clean up, and return the equipment to its original state.

Pulverized Coal Feed 6 Fan A: Fan: Bearing Housing

*Fig. 13E*

Assignment for John Lubetech
Demo Plant

11. Fan: Sealed Fan Bearing Housing Temporary Offline Filtration via Filter Cart (0.06 gpm, NoriaSyn 100)

1. Identify the level gauge and the drain and fill ports. Check their condition and clean them. Check the condition of the bearing housing.
2. Confirm the flow of the filter cart can be controlled to below 0.06 gpm. Position it within reach of drain and fill ports and connect to power supply.
3. Taking all possible precautions against contamination, connect the suction line of the filter cart to the drain port.
4. Taking all possible precautions against contamination, connect the discharge line of the filter cart to the fill port.
5. Set valves to engage the filter and open the flow control valve (if equipped). Turn on the cart, confirm flow and adjust rate to below 0.06 gpm (if equipped). Check for leakage.
6. Decontaminate the oil by running the portable device for a sufficient amount of time to turn the oil over at least 10 times (see full document). Check for proper operation every 10-15 minutes. Turn off the cart after the proper time has elapsed.
7. Taking all possible precautions against contamination, disconnect both connections to the filter cart and replace all caps. Stow the filter cart for next use.
8. Collect tools, clean up, and return the equipment to its original state.

Pulverized Coal Feed 2 Fan B: Fan: Bearing Housing

12. Fan: Sealed Fan Bearing Housing Temporary Offline Filtration via Filter Cart (0.06 gpm, NoriaSyn 100)

1. Identify the level gauge and the drain and fill ports. Check their condition and clean them. Check the condition of the bearing housing.
2. Confirm the flow of the filter cart can be controlled to below 0.06 gpm. Position it within reach of drain and fill ports and connect to power supply.
3. Taking all possible precautions against contamination, connect the suction line of the filter cart to the drain port.
4. Taking all possible precautions against contamination, connect the discharge line of the filter cart to the fill port.
5. Set valves to engage the filter and open the flow control valve (if equipped). Turn on the cart, confirm flow and adjust rate to below 0.06 gpm (if equipped). Check for leakage.
6. Decontaminate the oil by running the portable device for a sufficient amount of time to turn the oil over at least 10 times (see full document). Check for proper operation every 10-15 minutes. Turn off the cart after the proper time has elapsed.
7. Taking all possible precautions against contamination, disconnect both connections to the filter cart and replace all caps. Stow the filter cart for next use.
8. Collect tools, clean up, and return the equipment to its original state.

*Fig. 13F*

 Assignment for John Lubetech
Demo Plant

Pulverized Coal Feed 6 Fan B: Fan: Bearing Housing

13. Fan: Sealed Fan Bearing Housing Temporary Offline Filtration via Filter Cart (0.06 gpm, NoriaSyn 100)

1. Identify the level gauge and the drain and fill ports. Check their condition and clean them. Check the condition of the bearing housing.
2. Confirm the flow of the filter cart can be controlled to below 0.06 gpm. Position it within reach of drain and fill ports and connect to power supply.
3. Taking all possible precautions against contamination, connect the suction line of the filter cart to the drain port.
4. Taking all possible precautions against contamination, connect the discharge line of the filter cart to the fill port.
5. Set valves to engage the filter and open the flow control valve (if equipped). Turn on the cart, confirm flow and adjust rate to below 0.06 gpm (if equipped). Check for leakage.
6. Decontaminate the oil by running the portable device for a sufficient amount of time to turn the oil over at least 10 times (see full document). Check for proper operation every 10-15 minutes. Turn off the cart after the proper time has elapsed.
7. Taking all possible precautions against contamination, disconnect both connections to the filter cart and replace all caps. Stow the filter cart for next use.
8. Collect tools, clean up, and return the equipment to its original state.

Location: crush building: main floor: pulverizer room

---

Pulverized Coal Feed 1 Hopper: Rack & Pinion: Open Gearing

14. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
2. Remove all covers/guards. Check the condition of the open gear.
3. Using the refillable spray applicator, uniformly apply the Noria SprayLube to pinion and full length of rack of the open gear.
4. Collect tools, clean up, and return the equipment to its original state.

Pulverized Coal Feed 2 Hopper: Rack & Pinion: Open Gearing

*Fig. 13G*

Assignment for John Lubetech
Demo Plant

15. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
2. Remove all covers/guards. Check the condition of the open gear.
3. Using the refillable spray applicator, uniformly apply the Noria SprayLube to pinion and full length of rack of the open gear.
4. Collect tools, clean up, and return the equipment to its original state.

Pulverized Coal Feed 3 Hopper: Rack & Pinion: Open Gearing

16. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
2. Remove all covers/guards. Check the condition of the open gear.
3. Using the refillable spray applicator, uniformly apply the Noria SprayLube to pinion and full length of rack of the open gear.
4. Collect tools, clean up, and return the equipment to its original state.

Pulverized Coal Feed 4 Hopper: Rack & Pinion: Open Gearing

17. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
2. Remove all covers/guards. Check the condition of the open gear.
3. Using the refillable spray applicator, uniformly apply the Noria SprayLube to pinion and full length of rack of the open gear.
4. Collect tools, clean up, and return the equipment to its original state.

Pulverized Coal Feed 5 Hopper: Rack & Pinion: Open Gearing

*Fig. 13H*

 Assignment for John Lubetech
Demo Plant

18. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
2. Remove all covers/guards. Check the condition of the open gear.
3. Using the refillable spray applicator, uniformly apply the Noria SprayLube to pinion and full length of rack of the open gear.
4. Collect tools, clean up, and return the equipment to its original state.

Pulverized Coal Feed 6 Hopper: Rack & Pinion: Open Gearing

19. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
2. Remove all covers/guards. Check the condition of the open gear.
3. Using the refillable spray applicator, uniformly apply the Noria SprayLube to pinion and full length of rack of the open gear.
4. Collect tools, clean up, and return the equipment to its original state.

Location: crush building: second floor

Crush A Coal Hopper: Rack & Pinion: Open Gearing

20. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
2. Remove all covers/guards. Check the condition of the open gear.
3. Using the refillable spray applicator, uniformly apply the Noria SprayLube to pinion and full length of rack of the open gear.
4. Collect tools, clean up, and return the equipment to its original state.

*Fig. 13I*

 Assignment for John Lubetech
Demo Plant

Crush B Coal Hopper: Rack & Pinion: Open Gearing

21. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
2. Remove all covers/guards. Check the condition of the open gear.
3. Using the refillable spray applicator, uniformly apply the Noria SprayLube to pinion and full length of rack of the open gear.
4. Collect tools, clean up, and return the equipment to its original state.

Crush C Coal Hopper: Rack & Pinion: Open Gearing

22. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
2. Remove all covers/guards. Check the condition of the open gear.
3. Using the refillable spray applicator, uniformly apply the Noria SprayLube to pinion and full length of rack of the open gear.
4. Collect tools, clean up, and return the equipment to its original state.

Crush D Coal Hopper: Rack & Pinion: Open Gearing

23. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
2. Remove all covers/guards. Check the condition of the open gear.
3. Using the refillable spray applicator, uniformly apply the Noria SprayLube to pinion and full length of rack of the open gear.
4. Collect tools, clean up, and return the equipment to its original state.

*Fig. 13J*

 Assignment for John Lubetech
Demo Plant

Pulverizer A1 Hopper: Rack & Pinion: Open Gearing

24. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
2. Remove all covers/guards. Check the condition of the open gear.
3. Using the refillable spray applicator, uniformly apply the Noria SprayLube to pinion and full length of rack of the open gear.
4. Collect tools, clean up, and return the equipment to its original state.

Pulverizer A2 Hopper: Rack & Pinion: Open Gearing

25. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
2. Remove all covers/guards. Check the condition of the open gear.
3. Using the refillable spray applicator, uniformly apply the Noria SprayLube to pinion and full length of rack of the open gear.
4. Collect tools, clean up, and return the equipment to its original state.

Pulverizer B1 Hopper: Rack & Pinion: Open Gearing

26. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
2. Remove all covers/guards. Check the condition of the open gear.
3. Using the refillable spray applicator, uniformly apply the Noria SprayLube to pinion and full length of rack of the open gear.
4. Collect tools, clean up, and return the equipment to its original state.

*Fig. 13K*

 Assignment for John Lubetech
Demo Plant

Pulverizer B2 Hopper: Rack & Pinion: Open Gearing

27. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
   2. Remove all covers/guards. Check the condition of the open gear.
   3. Using the refillable spray applicator, uniformly apply the Noria SprayLube to pinion and full length of rack of the open gear.
   4. Collect tools, clean up, and return the equipment to its original state.

Pulverizer C1 Hopper: Rack & Pinion: Open Gearing

28. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
   2. Remove all covers/guards. Check the condition of the open gear.
   3. Using the refillable spray applicator, uniformly apply the Noria SprayLube to pinion and full length of rack of the open gear.
   4. Collect tools, clean up, and return the equipment to its original state.

Pulverizer C2 Hopper: Rack & Pinion: Open Gearing

29. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
   2. Remove all covers/guards. Check the condition of the open gear.
   3. Using the refillable spray applicator, uniformly apply the Noria SprayLube to pinion and full length of rack of the open gear.
   4. Collect tools, clean up, and return the equipment to its original state.

*Fig. 13L*

Assignment for John Lubetech
Demo Plant

Pulverizer D1 Hopper: Rack & Pinion: Open Gearing

30. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
   2. Remove all covers/guards. Check the condition of the open gear.
   3. Using the refillable spray applicator, uniformly apply the Noria SprayLube to pinion and full length of rack of the open gear.
   4. Collect tools, clean up, and return the equipment to its original state.

Pulverizer D2 Hopper: Rack & Pinion: Open Gearing

31. Rack & Pinion: Rack & Pinion Open Gearing Aerosol Direct Relubrication with Noria SprayLube 1. This activity exposes the maintainer to potential sources of hazardous mechanical energy. Be sure to follow all applicable plant LOTO policies that pertain to this scope of maintenance work.
   2. Remove all covers/guards. Check the condition of the open gear.
   3. Using the refillable spray applicator, uniformly apply the Noria SprayLube to pinion and full length of rack of the open gear.
   4. Collect tools, clean up, and return the equipment to its original state.

Location: crush building: main floor: pulverizer room

---

Pulverizer A2: Pulverizer: Whetted Portion of Lube Oil System: Reservoir

32. Whetted Portion of Lube Oil System: Whetted Portion of Lube Oil System Reservoir Breather Replacement & Reset of Vacuum Indicator 1. Identify the breather & its connection point. Clean the area of the breather attachment.
   2. Taking all possible precautions against contamination, remove the breather.
   3. Taking all possible precautions against contamination, install the new ??? securely and mark with date.
   4. Identify & reset the vacuum minder.

*Fig. 13M*

| User: John Lubetech | LPM - Tech Feedback | Date Last Retrieved: Date, Time |

Navigate Manage Work Contact Us Log Out

TASK

ORDER TASKS

| # | Task | Complete | Eng. Review | | |
|---|------|----------|-------------|---|---|
| 1 | Pulverized Coal Feed 1 Fan B: Motor: Bearing Housing: Bleed Water | ☐ | ☐ | △ | ◯ |
| 2 | Pulverized Coal Feed 4 Fan B: Motor: Bearing Housing: Drain Down | ☐ | ☐ | △ | ◯ |
| 3 | Pulverized Coal Feed 6 Fan B: Motor: Bearing Housing: Drain Down | ☐ | ☐ | △ | ◯ |
| 4 | Pulverized Coal Feed 4 Fan B: Fan: Bearing Housing: Bleed Water | ☐ | ☐ | △ | ◯ |
| 5 | Pulverized Coal Feed 3 Fan A: Fan: Bearing Housing: Top Up | ☐ | ☐ | △ | ◯ |
| 6 | Pulverized Coal Feed 3 Fan B: Fan: Bearing Housing: Top Up | ☐ | ☐ | △ | ◯ |
| 7 | Pulverized Coal Feed 6 Fan B: Fan: Bearing Housing: Top Up | ☐ | ☐ | △ | ◯ |
| 8 | Pulverized Coal Feed 1 Fan A: Fan: Bearing Housing: Filter Offline | ☐ | ☐ | △ | ◯ |
| 9 | Pulverized Coal Feed 2 Fan A: Fan: Bearing Housing: Filter Offline | ☐ | ☐ | △ | ◯ |
| 10 | Pulverized Coal Feed 5 Fan A: Fan: Bearing Housing: Filter Offline | ☐ | ☐ | △ | ◯ |
| 11 | Pulverized Coal Feed 6 Fan A: Fan: Bearing Housing: Filter Offline | ☐ | ☐ | △ | ◯ |
| 12 | Pulverized Coal Feed 2 Fan B: Fan: Bearing Housing: Filter Offline | ☐ | ☐ | △ | ◯ |
| 13 | Pulverized Coal Feed 6 Fan B: Fan: Bearing Housing: Filter Offline | ☐ | ☐ | △ | ◯ |
| 14 | Pulverized Coal Feed 1 Hopper: Rack & Pinion: Open Gearing: Relubricate | ☐ | ☐ | △ | ◯ |
| 15 | Pulverized Coal Feed 2 Hopper: Rack & Pinion: Open Gearing: Relubricate | ☐ | ☐ | △ | ◯ |
| 16 | Pulverized Coal Feed 3 Hopper: Rack & Pinion: Open Gearing: Relubricate | ☐ | ☐ | △ | ◯ |
| 17 | Pulverized Coal Feed 4 Hopper: Rack & Pinion: Open Gearing: Relubricate | ☐ | ☐ | △ | ◯ |

© 2006 Noria Corporation-CONFIDENTIAL: This product, its features and all screens are covered under existing non-disclosure agreements.

*Fig. 14*

LUBRICATION PROGRAM MANAGEMENT SYSTEM AND METHODS

CROSS-REFERENCE TO RELATED APPLICATIONS

Not applicable.

BACKGROUND OF THE INVENTION

1. Field of the Invention

The present invention relates generally to management of maintenance activities. More specifically, but not by way of limitation, the present invention relates to systems and methods for lubrication program management.

2. Discussion of Related Art

Facilities such as manufacturing facilities, factories, and the like often house and make use of numerous pieces of equipment. Such equipment may include manufacturing and/or processing equipment, for example, pumps, fans, conveyors, turbines, mixers, compressors, hydraulics, presses, molding machines, stamping and/or cutting equipment, CNC machines, and the like. Additionally, such equipment may include packaging machines, printing machines, and the like.

Each piece of equipment generally requires at least one, and often several, individual maintenance tasks to be performed periodically and/or intermittently. Each piece of equipment may also have several individual machine components upon or with which one or more maintenance tasks are required. For example, a single piece of equipment may include: several grease fittings that each needs to be greased periodically, oil that needs to be changed periodically, one or more oil filters that need to be changed periodically, one or more mechanical joints that require periodic and/or intermittent inspection, one or more air filters that require periodic inspection and intermittent replacement, as well as components that may require periodic and/or intermittent cleaning, painting, and other maintenance tasks.

In a facility with multiple machines, where some or all of such machines require numerous maintenance tasks, scheduling and management of maintenance is highly difficult and time consuming. Numerous maintenance technicians may be employed to ensure that these maintenance tasks are completed in a timely fashion to prevent equipment failures and ensure reliable and efficient functioning of equipment. The scheduling and coordination of various maintenance tasks becomes even more complex when tasks must be assigned among various technicians whom often have varying degrees of skill and availability. As is understood by those skilled in the art, such scheduling can be extremely difficult without the assistance of computerized software for assisting managers and/or engineers in the scheduling and assignment of maintenance tasks. To this end, computerized systems exist that assist managers and engineers in the scheduling of maintenance tasks in a facility. Such computer systems and methods may be referred to in the art as 'Computerized Maintenance Management Systems' or 'CMMS.' A variety of computerized tools have attempted to reduce the burden of scheduling and management aspects of maintenance tasks. However, simplifications and generalizations in these automated scheduling tools, such as the introduction of routes, exacerbate the work completion burden by the inefficiencies they introduce.

A "route" is generally known in the art as a static assignment that is intended to be reused multiple times, which may effectively amortizes the time required to define the route over multiple instances. In generating such routes, prior art systems and methods generally prioritize factors that allow scheduling ease ahead of factors that improve execution efficiency. Factors such as periodicity of tasks may take on preeminent importance, even though such preeminence of one task may directly reduce the efficiency of workers. For example, once per month, weekly activities correspond with monthly activities, yet in a conventional route-based system often workers must walk to the same equipment with the same tools twice. Further, to keep the route intact for its next execution it must normally be completed as a unit, even though factors such as operational limitations and the like can prevent all work from being completed at the same time. In a route based system, however, the result is that some fraction of the work will be done either early or late on the next iteration, with negative repercussions either way.

One alternative seeks to alleviate the limitations imposed in routes by scheduling each task individually in assignments for one-time use. One example of such an alternative system is disclosed in U.S. Pat. No. 5,856,931 (issued to McCasland and hereinafter referred to as 'McCasland'), which is expressly incorporated by reference herein in its entirety. McCasland describes a "process and system for identifying specific items or assets which require time-based or on-demand attention, a method of planning and scheduling activities on the located items or assets, analysis on actions performed relative to the items or assets and adherence to a time-based schedule for scheduled activities." However, the McCasland reference has a number of other shortcomings that will be readily apparent to those of ordinary skill in the art with reference to the figures, description, and claims herein.

SUMMARY OF EXEMPLARY EMBODIMENTS

The preferred embodiment of the present invention amortizes the effort associated with scheduling maintenance tasks over many completions of the maintenance tasks; provides for rapid assignment creation at or near the time of assignment execution/completion; assists with increasing the optimization and/or efficiency of assignments with respect to substantially-real-time facility conditions; and considers and/or assists a user in considering substantially-real-time changes and/or adjustments in the facility or plant, the scheduling process, and/or the maintenance to be completed.

A non-restrictive query design mechanism preferably builds upon basic logical operators to provide high level constructs such as EXCEPT, IF THEN, IF THEN ELSE and expansive levels and placement of parenthetical expressions. This query design mechanism, or query engine, preferably may be used to design one or more route plans; and, in combination with a query evaluation mechanism (preferably included in, or in conjunction with the query engine), preferably allows the one or more route plans to be evaluated in real time to produce an assignment without requiring manual pre-selection of individual maintenance tasks. Evaluation of the route plan preferably incorporates all changes made to the design of the maintenance program and to the population of maintenance tasks that may be due. Real time information on operating state of equipment relative to the operating state required to complete maintenance activities is also preferably taken into account. With the ability to create improved and/or more efficient assignments via real-time query generation and/or application; assignments may be created that include tasks of any reschedule logic or interval, thereby reducing, if not eliminating, the need to organize routes around tasks of the same periodicity, as must be done with conventional routes. In one embodiment, logical constructs, operators, and/or compound operators may be used to improve the amount of work a technician may accomplish with particular tools and skills, such as, for example, in a given geographical region of the plant.

The query design and evaluation capability is preferably combined with a powerful scheduling mechanism (also preferably included in, or in conjunction with, the query engine), that preferably permits each individual maintenance task to be tracked independently, scheduled on a periodic and/or on-condition basis, and prioritized with a mechanism called urgency that takes into account the criticality of the machine and/or maintenance point on which the work is to be done, the importance of the task, the ability to eliminate causes of failure for the machine on which it is to be done, and/or the degree to which the work is currently overdue. The scheduling mechanism also preferably considers the estimated time required to complete each task, thereby allowing work satisfying the query criteria to be prioritized in terms of which are most important to execute immediately, based upon timeliness, urgency, or efficiency.

The present invention preferably models the facility subject to the maintenance program managed and/or scheduled. The structure of the facility is preferably modeled with a series of orthogonal hierarchies. Each hierarchy preferably represents a dimension, independent from others, by which the machines of the plant may be divided and/or organized. These hierarchies are preferably represented by recursive parent child relationships which may be visualized and/or displayed in the form of a tree or syntax tree. These hierarchies may have one or more levels of structure below the root, and the number of levels need not be symmetrical across the various branches. Examples of hierarchies typically modeled in such a manner are "Physical Location", "Maintenance Responsibility", and "Accounting Responsibility". In the preferred embodiment, any hierarchy node can be utilized by the query design engine as a condition in a query. Thus, the complexity of queries that can be created is expansive, as the structure and/or number of such queries and hierarchies are preferably not limited.

The productive assets and/or machines of the facility are also preferably modeled and/or represented within the system. The machines, which may be visualized a forest of such hierarchical trees, are preferably modeled as a series of whole-part relationships to any level necessary to identify all maintenance points upon which tasks may need to be performed.

Separately, the invention preferably maintains a collection of globally-defined task templates. These templates preferably define the types of tasks to be performed, and preferably include the best practices and procedures for the completion of the respective tasks. The task templates also preferably define placeholders where data, preferably specific to individual maintenance points with which the task templates may be associated, may be substituted prior to display. Task templates themselves are also preferably organized within a hierarchy of task template types; preferably permitting a query to utilize information about task types as filtering criteria, such as a condition or parameter.

The present invention also preferably supports the creation of associations between the primary entities of the system (hierarchy node, machine node, global task template) and between the results of these associations, such as, for example, where such an association results in an instance of a derived entity. By way of example, machine nodes may be associated to hierarchy nodes to state that the machine node and all its parts (unless explicitly a member of another hierarchy node from the same hierarchy) are a member of that branch of the hierarchy rather than any other. Such associations preferably define membership only within that single dimension, and the machine may have (and typically does) have separate associations to other hierarchy dimensions, levels, and/or node.

Individual or specific maintenance task definitions are preferably defined as associations between machines and/or maintenance points and task templates, such that each time the task definitions is accessed, viewed, evaluated, or the like, it is dynamically generated from the underlying machine and/or maintenance point data and the task template data, so as to preferably reflect the most currently-available data possible. Such associations can preferably occur at any level of a machine tree, designating a maintenance point where it is associated to the machine tree. This concrete task definition can preferably, in turn, be associated to other hierarchy nodes, indicating that it is a particular task for a particular machine that is a member of that branch of the hierarchy. Where no such association is made for a particular concrete task, associations defined for the maintenance point or any of its machine parents may alternatively define where the concrete task definition may be found within the hierarchy.

Directly-stored entity relationships are preferably not the only mechanism supported for defining the membership of machines or concrete tasks within hierarchies. For example, the query engine itself can preferably be used to define a hierarchy in virtual form by specifying a query that can be evaluated to determine the membership of machines and concrete tasks within each branch of the hierarchy. Such virtual hierarchies are preferably self-maintaining, in that any change in data or direct associations to other hierarchies on which the query is based are automatically factored into the evaluation of the query when it is evaluated. Virtual hierarchies, being hierarchies, can also be used as conditions in queries.

In addition to defining virtual hierarchies, queries can also preferably be used to define the members of a special type of degenerate hierarchy that contains no additional structure beyond the root node. Such a degenerate hierarchy is known as a set. Sets can preferably be defined virtually, such as with a query, or explicitly, such as with associations. The sets themselves may also preferably be identified as being part of a group. Another type of degenerate hierarchy, one that has known or predetermined level of structure below the root, may also form the basis of allowable values to serve as the options for a "pick from list" data field.

Entities in the present invention can also preferably have data associated with them. This preferably includes machine nodes, maintenance point nodes, hierarchy nodes, and task definitions. Data may preferably be collected in fields in the form of text, numeric information, numeric information in a unit of measure, or as a single selection from within a hierarchy or zero or more selections from within a group of sets. Where the data is represented as a set or hierarchy association, that association may be explicit (an actual association) or virtual (defined by a query).

BRIEF DESCRIPTION OF THE DRAWINGS

FIGS. 6A-6D collectively depict an exemplary global task template constructed in accordance with the present invention.

FIG. 10 depicts a plurality of exemplary queries constructed in accordance with the present invention.

FIG. 11 depicts an exemplary route plan constructed in accordance with the present invention.

FIGS. 13A-13M depict an exemplary assignment created in accordance with the present invention.

FIG. 14 depicts an exemplary method of reporting feedback regarding the various maintenance task definitions included in an assignment.

DETAILED DESCRIPTION OF EXEMPLARY EMBODIMENTS

For clarity and brevity, the several exemplary embodiments of the methods and systems will be described with reference to a manufacturing facility having a plurality of machines, with several, if not all, of the machines each having one or more maintenance points that require periodic maintenance. It will be understood by those skilled in the art, however, that the methods and systems herein described will lend themselves to implementation with a variety of collections of equipment, vehicles, tools, other assets, or the like, that may require periodic maintenance tasks to be performed thereon.

Figure 1:
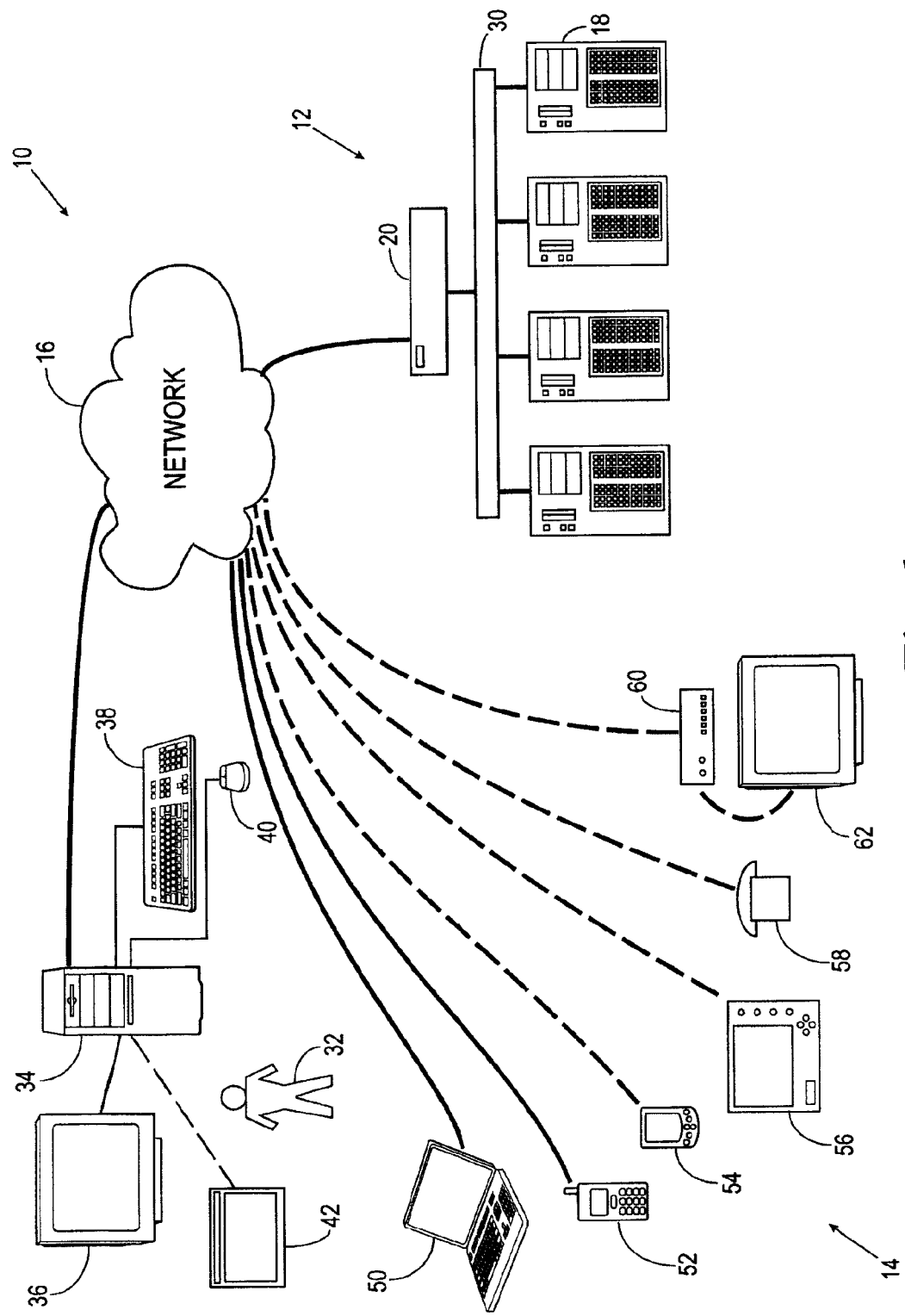
FIG. 1 is a schematic view of a maintenance scheduling system constructed in accordance with one embodiment of the present invention.

Referring now to the drawings, and more particularly to FIG. 1, shown therein and designated by the general reference numeral 10 is a schematic view of a maintenance scheduling system 10 constructed in accordance with one embodiment of the present invention. The maintenance scheduling system 10 may hereinafter also be referred to as the scheduling system 10 and/or the system 10. In general, and as will be discussed in more detail below, the system 10 preferably includes at least one web page, home page, or software interface page 80 which permits a user and/or technician to perceive visual or audiovisual content associated with the system 10.

In general, FIG. 1 is an exemplary hardware diagram for the system 10. The system 10 preferably includes a host system 12, communicating with one or more user devices 14 via a network 16. The network 16 can be the Internet or other network. In either case, the host system 12 typically includes one or more servers 18 configured to communicate with the network 16 using one or more gateways 20. In other embodiments, the host system 18 may be a single personal computer, or the like, programmed to implement some or all of the methods of the present invention, as will be described in more detail below. When the network 16 is the Internet, the primary user interface of the system 10 is preferably delivered through a series of web pages, but the primary user interface can be replaced by another type of interface, such as, for example, a Windows-based application permitting users to access or interact with the host system 12 graphically, textually, audiovisually, or the like. This method can also be used when the user device 14 of the system 10 is located in a stand-alone or non-portable environment such as a kiosk.

The network 16 can be almost any type of network, although the Internet and Internet 2 networks are preferred because of the wide support of their underlying technologies. The preferred embodiment of the network 16 exists in an Internet environment, which means a TCP/IP-based network. However, it is conceivable that in the near future, it may be advantageous for the preferred or other embodiments to utilize more advanced networking topologies. In addition, the network 16 does not refer only to computer-based networks but can also represent telephone communications or other communications. In other embodiments, one or more user devices 14 will be enabled to individually run software and the like in order to implement the methods of the present invention, as will be described in more detail below, such that the one or more user devices 14 need not be in communication with the host system 12 via network 16; and, instead, may be periodically connected and/or placed in communication with the host system 12 so as to synchronize and/or transfer all, or a portion of, the data stored on either of the one or more user devices 14 and/or the host system 12.

The servers 18 can be networked with a local area network 30. The gateway 20 is preferably one or more entities or devices responsible for providing access between the local area network and the network 16. The gateway 20 can also be used as a security means to protect the local area network 30 from attack from an external network such as the network 16.

The local area network 30 can be based on a TCP/IP network such as the Internet, or can be based on any other suitable underlying network transport technology. The preferred embodiment uses an Ethernet network with TCP/IP because of the availability and acceptance of underlying technologies, but other embodiments may use other types of networks such as Fiber-Channel, SCSI, gigabyte Ethernet, etc.

As discussed above, in one preferred embodiment, the host system 12 includes the servers 18. The configuration of the hardware for the servers 18 will depend greatly upon requirements and needs of the particular embodiment of the system 10. Typical embodiments, including the preferred embodiment, will include multiple servers 18 with load-balancing to increase stability and availability. It is envisioned that the servers 18 will include database servers and applications/web servers. The database servers are preferably separated from the application/web servers to improve availability and also to provide the database servers with improved hardware and storage.

The user devices 14 can be any number and type of devices. The most typical scenario of the user device involves a user 32, using a computer 34 with a monitor 36, a keyboard 38, and a mouse 40. In the preferred embodiment, the user 32 is required to use a type of software called a "browser" as designated by a reference numeral 42. The browser 42 is used to render content that is received from a source, such as the servers 18. In the modern vernacular, a "browser" refers to a specific implementation called a Web browser. Web browsers are used to read and render HTML, XHTML, XML, and/or any other suitable content that is generated when requesting resources from a web server. In the preferred embodiment, the system 10 is designed to be compatible with major Web browser vendors such as Microsoft Internet Explorer, Mozilla Firefox, Netscape Navigator, and Opera. However, other embodiments may wish to focus on one particular browser depending upon the common user base connecting to the servers 18.

The user devices 14 can also be implemented as a portable device such as a laptop computer 50 (or handheld computer); a cellular telephone 52 with a micro or embedded Web browser; a portable digital assistant 54 (PDA) capable of wireless network access; a pen-based or tablet computer 56. In another embodiment, the user device 14 can be a cable-television box 60 or other similar device, such as a Web TV appliance, for viewing through a monitor 62 or television. Current embodiments of the system 10 can also be modified to use any of these or future developed devices.

The system 10 is designed in this way as to provide flexibility in its deployment. Depending upon the requirements of the particular embodiment, the system 10 could be designed to work in almost any environment such as a desktop application, a Web based application, or simply as a series of Web services designed to communicate with an external application. In yet further embodiments, various portions, e.g., 12, multiple 14's, of the system 10, may cooperate to implement the methods of the present invention.

For example, a portion of the data may be stored remotely on the servers 18 and a portion of the data stored locally on a computer 34. In such an embodiment, the operative software and/or coding may be partially or wholly stored and/or implemented on either or both of the servers 18 and the computer 34, and assignments generated, in whole or in part, at either or both of the host system 12 and/or the computer 34. Such assignments may then be sent and/or otherwise output to another of the user devices 14, such as, for example, a PDA 54, laptop computer 50, or tablet computer 56 associated with a particular user and/or technician.

As will be appreciated by those skilled in the art, the methods and systems described herein may be implemented in any suitable fashion. For example, the various data described above may be stored in any one or more suitable storage media, such as a flash drive, hard drive, compact disc (CD), digital video disc (DVD), servers, or the like. Similarly, it will be appreciated that the computerized systems described herein will generally include one or more processors, or the functional equivalent thereof, to access and/or communicate with the one or more storage media and selectively and/or automatically implement various programming, code, or the like. Additionally, the system 10 preferably includes one or more, and most preferably at least one, means for outputting data to a user. For example, such means for outputting may include nearly any, if not all, of the user devices 14, and may further include printers, and/or any other suitable means for outputting such data in a form perceivable by a user.

Additionally, the various methods and/or steps described herein may be implemented through software enabling a customer and/or user to adapt a system to implement such methods and/or steps. For example, software may comprise instructions for such methods and/or steps, with such instructions stored on one or more computer-readable media. Such computer-readable media may include, for example, diskettes, compact discs (CDs), digital video discs (DVDs), flash drives, servers, hard drives, and/or the like. Such software may be distributed in any suitable fashion, for example, by providing a customer or the like with a one or more computer-readable media storing the software, by permitting a customer or the like to download the software from a server, such as over the internet or other network, or by installing the software on a customer system. Such methods will often also include the execution of, or entering into, a contract between the provider and the customer, and/or will also preferably include the payment of, or promise to pay, a fee. Such fee may be a one-time payment, may be a monthly subscription fee, may be a percentage based on production, performance, improvements, or the like, or any other suitable fee arrangement or trade for valuable consideration.

Throughout this document, the words user, maintenance technician, technician, and the like, are generally used interchangeably, unless otherwise indicated.

Figure 2:
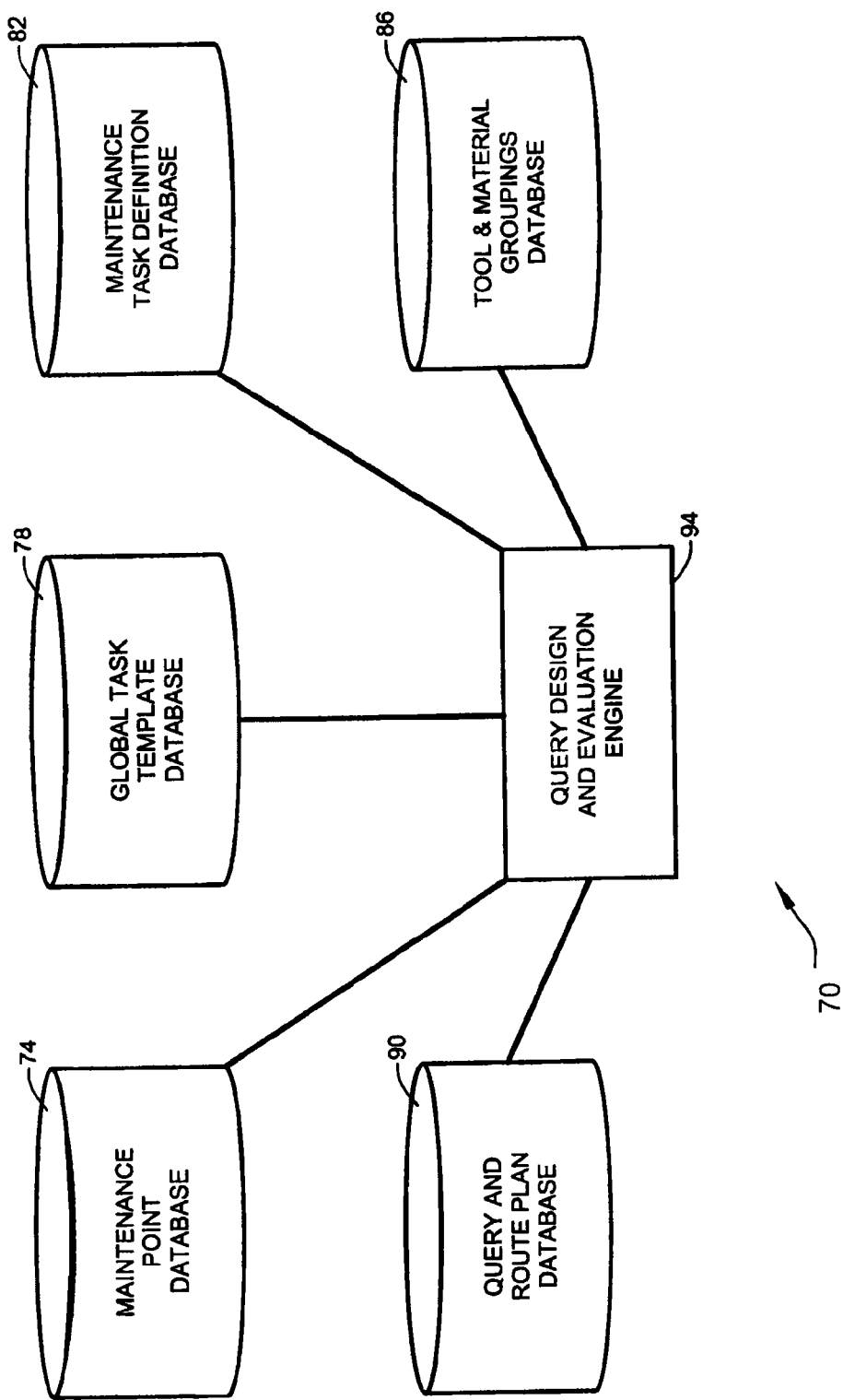
FIG. 2 is a conceptual block diagram of an exemplary storage and processing structure for use in the maintenance scheduling system of FIG. 1.

Referring now to FIG. 2, shown therein and designated by the reference numeral 70 is conceptual block diagram of an exemplary storage and processing structure for use, in whole or in part, with one or more of the various components, e.g. 12, 14, of the system 10 depicted in FIG. 1. The structure 70 preferably includes a maintenance point database 74, a global task template database 78, a maintenance task definition database 82, a tool and materials groupings database 86, a query and route plan database 90, and a query design and evaluation engine 94.

The maintenance point database 74 preferably stores data relating to a plurality of machines and/or maintenance points, as will be described in more detail below. The global task template database 78 preferably stored data relating to a plurality of globally-defined task templates which can be associated with one or more maintenance points, while still being capable of modification on a global basis. The maintenance task definition database 82 preferably stores a plurality of associations between maintenance points and global task templates, wherein such associations define a plurality of maintenance task definitions. The tool and material groupings database 86 preferably stores data relating to a plurality of tools and a plurality of materials, and/or associations, groupings, and/or virtual hierarchies of tools and/or materials that are preferably kept and/or accessible at a facility where the system 10 is implemented. The query and route plan database 90 preferably stores data related to a plurality of queries and/or route plans which are essentially filters that return maintenance task definitions in accordance with set filter criteria, parameters, logical relationships, and values which define the queries and route plans. The query design and evaluation engine 94 is preferably in communication with each of the databases 74, 78, 82, 86, 90, so as to selectively access the data from each so as to generate and apply the queries and route plans to the most currently-available base data from each of the databases 74, 78, 82, 86, and 90, as will be described in more detail below.

It should be appreciated that the structure 70 is described generally and conceptually, in one exemplary embodiment suitable for implementation of the system 10 and the methods of the present invention which will be described in more detail below. In other embodiments, some or all of the databases may be combined, supplemented, or omitted, as required and/or desired for various implementations. For example, an additional personnel database (not shown) may be added for storing data related to a plurality of users and technicians employed within a facility. Additionally, the maintenance task definitions database 82 may be combined with the either or both of the maintenance point database 74 and the global task template database; especially because the storage necessary for maintenance task definitions is preferably minimal since task definitions are preferably defined as associations rather than separate sets of compound or derived data.

Figures 3, 5:
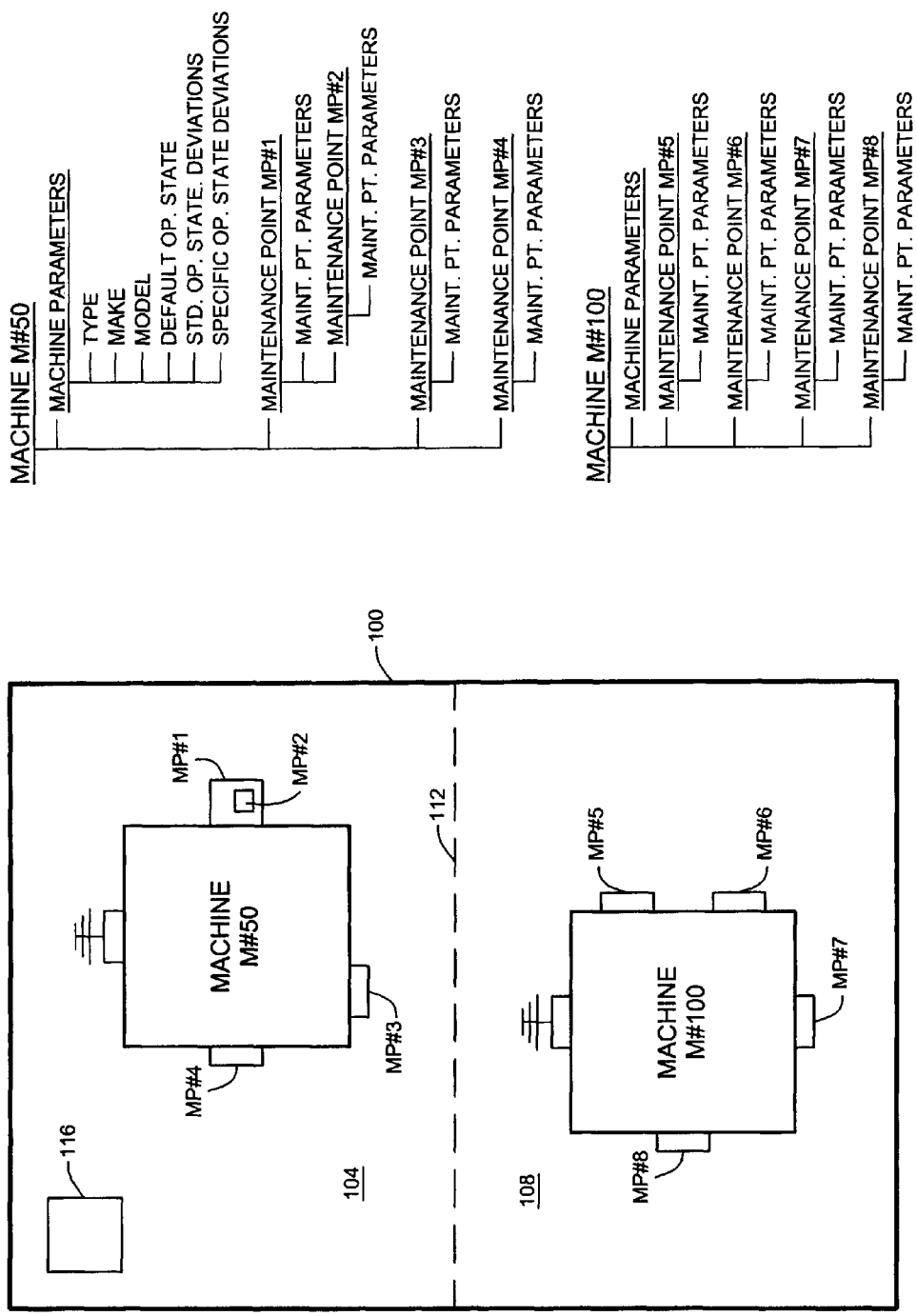
FIG. 3 is a diagrammatic representation of an exemplary manufacturing facility constructed in accordance with the present invention.
FIG. 5 depicts exemplary machine and maintenance point data for the facility of FIG. 3.

Referring now to FIG. 3, depicted therein and designated by the reference numeral 100 is an exemplary manufacturing or processing facility 100 constructed in accordance with the present invention. The exemplary facility 100 is shown having a first room 104 and a second room 108, separated by a wall 112. The first room 104 contains a smaller storage room 116, such as for storing maintenance tools and materials, and a machine M#50. The second room 108 contains a machine M#100.

As is common in the art, the machines M#50 and M#100 are shown having a plurality of maintenance points MP#1-MP#8. Although, each of the machines M#50 and M#100 are shown with a plurality of maintenance points, e.g., MP#1-MP#8, such machines may each have anywhere from one to many maintenance points, and, although rare, a machine in such a facility 100 may conceivably have zero maintenance points, i.e., require maintenance tasks to be performed on the machine as a whole, or not require maintenance during its useful life.

Figure 4:
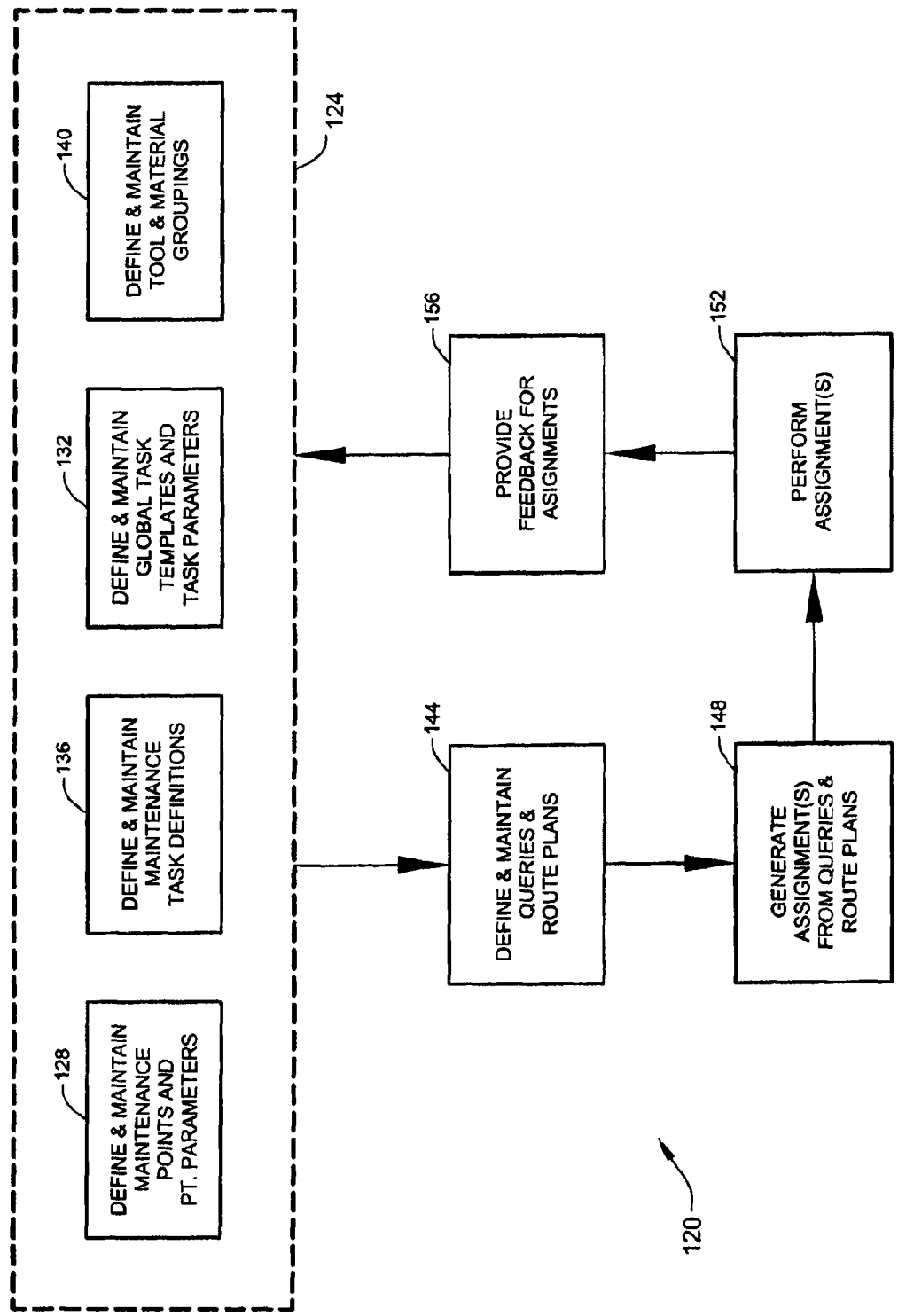
FIG. 4 is a flowchart illustrating one exemplary method of maintenance scheduling in accordance with the present invention.

Referring now to FIG. 4, a flow diagram is shown depicting one embodiment of a method 120 for scheduling maintenance in accordance with the present invention. The method 120 preferably includes a data module 124 wherein base data and associations (such as virtual and/or concrete hierarchies and/or sets) relating to maintenance points, task templates, task definitions, tool & material groupings, and the like are defined, stored, organized, and/or maintained. More specifically, the data module 124 preferably includes: a step 128, conceptually corresponding to the maintenance point database 74 of FIG. 2, wherein machines, e.g. M#50 and M#100 (FIG. 3), machine parameters, maintenance points, e.g. MP#1-MP#8, and maintenance point parameters are preferably defined, catalogued, organized, stored, and/or maintained; a step 132, conceptually corresponding to the global task template database 78 of FIG. 2, wherein task templates are preferably globally-defined, catalogued, organized, stored, and/or maintained; a step 136, conceptually corresponding to the maintenance task definition database 82 of FIG. 2, wherein maintenance task definitions (preferably associations between maintenance points and task templates) are preferably defined, catalogued, organized, stored, and/or maintained; and a step 140, conceptually corresponding to the tool & material groupings database 86 of FIG. 2, wherein data relating to tools, materials, and/or groupings or associations thereof are preferably defined, catalogued, organized, stored, and/or maintained; all of which steps 128, 132, 136, and 140 will be described in more detail below.

The method 120 preferably further includes: a step 144, conceptually corresponding to the query design and evaluation engine 94 of FIG. 2, wherein queries and route plans are preferably defined, catalogued, organized, stored, and/or maintained that can be dynamically applied to the data maintained in data module 124 to; a step 148, where the queries and route plans of step 144 are applied to the data of the data module 124 to extract maintenance tasks having desired characteristics in order to generate assignments for users and/or maintenance technicians; a step 152, wherein the respective users and/or maintenance technicians perform the maintenance tasks included in their respective assignments; and a step 156 wherein the users and/or maintenance technicians provide feedback regarding the completion or lack thereof of the various maintenance tasks such that it can be used to update the data maintained in the data module 124; all of which steps 144, 148, 152, and 156 will be described in more detail below.

As identified and/or defined in step 128, and as best shown in FIG. 5, the structure of machines, e.g. M#50 and M#100 (FIG. 3) is preferably represented hierarchically, with no restriction on the number of levels used (or not used) on any branch of the tree. In the degenerate case, the hierarchy has only one level, listing each maintenance point, e.g., M#1-M#8, without any structure, i.e., maintenance point parameters. The maintenance points MP#1-MP#8 are preferably organized in such hierarchal fashion such that a global task template may be attached or associated at any level or node of the hierarchy. More specifically, task templates (described below) can preferably be associated at any level of the hierarchy, such that respective task templates may selectively be applied to all, part, or none of the nodes below the node at which the template is attached or associated, as will be described in more detail below. Such machines may be a single machine, e.g., M#50 or M#100, a portion of a machine, an assembly line, or any other assembly, equipment, or the like with which one or more maintenance points may be associated.

The maintenance points MP#1-MP#8 may be any point, part, collection of parts, component, collection of components, or assemblies that may require maintenance. As is shown in the hierarchy for machine M#50, maintenance point MP#2 is nested within, or dependent upon, maintenance point MP#1. Such nested or dependent maintenance points may be nested or dependent to any level or degree. For example, a maintenance point may be a conveyor assembly, which would be defined as a root node or primary node for the maintenance point, with any number of dependent or nested maintenance points thereunder, such as, for example, an electric motor nested under the conveyor assembly, a bushing nested under the electric motor, and so on. The exemplary organization structures are merely illustrative and are not intended to be limiting. In some embodiments, the data may not actually be collected or stored in hierarchal fashion, but will preferably include associations and the like, such that data may be organized and/or displayed to a user in hierarchal fashion when desired and/or required.

Additionally, machine parameters are preferably identified for the machines M#50 and M#100, and maintenance point parameters are preferably identified for each maintenance point MP#1-MP#8. Machine parameters may include make, model, absolute and/or relative position of the machine, part numbers, parts lists, machine schematics and/or diagrams, the default operating state of the machine, standard and/or expected operating state deviations, actual operating state deviations, machine criticality, or the like. Additionally, various portions of the system 10 preferably store data indicative of the absolute and/or relative position of one or more spatial reference points, e.g., the office 116 (FIG. 3) such that maintenance tasks to be performed on multiple maintenance points may be sequenced and/or scheduled logically and efficiently, for example, to reduce the unnecessary travel between maintenance points.

The default operating state is preferably indicative of the operating state within which the machine, e.g. M#50 or M#100, and therefore the maintenance points associated therewith, is typically in, and may be expressed in terms of the operating state of the machine, e.g., "running" vs. "down", the operating state of a portion of the machine, the operating state of an assembly line to which the machine or maintenance point belongs, or in any other suitable fashion that indicates to a user and/or system implementing the method 10 what operating state the maintenance point will be, or is likely to be, found. For example, multiple machines of a single assembly or processing line may be hierarchically associated such that a default operating state of the line will apply to each of the machines associated therewith. Standard operating state deviations may be expressed in terms of time per day, days per week, days per month, or any other suitable fashion which permits a user and/or system implementing the method to determine when the maintenance point is likely to found in an operating state that deviates from the default operating state.

Additionally, the system 10 preferably permits users, technicians, or the like to define actual operating state deviations. For example, when a machine is actually running or down, one or more users are preferably permitted to indicate this in the system 10, so as to permit the system 10 to determine the actual operating state. The user is also preferably free to define multiple hierarchies that represent alternate default operating states. Each such hierarchy represents a normal plant configuration, and each has the same categories identified. One possible categorization system is "running" vs. "not running" vs. "variable/unknown". Each machine is preferably attached to or associated with such an hierarchy under the appropriate nodes. Users will update which of these alternatives is the current default operating state for the plant in real time. As more specific real time information is available for individual machines it is taken into account by the system, overriding the current default. This data may come from users or from other systems that already have access to that data, such as process control systems. If input by users, the preferred embodiment of the system 10 prompts for, or requests, such data only for machines that have active maintenance task definitions requiring a particular operating state to reduce the data entry burden to only those facts that will impact other decisions. In one preferred embodiment, all or some of the machines, e.g., M#50 and M#100 (FIG. 30) are provided with electronic devices 132 (FIG. 3), which are preferably capable of sensing and/or monitoring the operating state of one or more machines and transmitting such information, either directly or indirectly (such as via one or more user devices 14), to any portion or portions of the system 10 storing and/or maintaining data for the machines and/or maintenance points.

The machine criticality is preferably indicative of the relative criticality of the machine, e.g. M#50 or M#100 relative to other machines, e.g. M#50 or M#100, in the facility 100 (FIG. 3). In one preferred embodiment, criticality is a measure of the potential financial impact of a failure of the machine that is independent of the cause or actions that may prevent those causes. Thus, it may take into account the cost of failures related to lost production opportunities, reduced production efficiency, power consumption, environmental/safety impacts, and the direct cost of the repair, and/or any other suitable factors.

The machine criticality may be expressed as a static numerical digit or may be expressed dynamically, such as, for example, as an equation or the like, that directly, indirectly, quantitatively, or qualitatively derives a criticality value from any number of suitable factors, such as, for example: current production level of the machine, e.g. M#50 or M#100, relative to the that of other machines, e.g. M#50 or M#100 (FIG. 3); current value, profit margin, or sale price or items produced by the machine relative to that of other machines; planned obsolescence of a machine; and/or any other factors which may indicate to a user and/or system implementing the method 10 the importance of various machines relative to one another.

For example, if machine M#50 is given a machine criticality of "2", whereas machine M#100 is given a machine criticality of "1", it would indicate that maintenance of machine M#50 is relatively more critical than that of machine M#100. Stated otherwise, a failure of machine M#50 would be expected to have a greater negative impact than a failure of machine M#100. Additionally, the system 10 preferably permits machine criticality, as well as other criticalities mentioned herein, to be input as a numeric value, or by defining associations to a criticality hierarchy where the value of each selection option is defined by a numeric value attached to the hierarchy node rather than directly to the machine; thereby permitting criticalities to be used with greater flexibility and/or complexity within queries. It should also be pointed out that data collected on a machine is preferably considered by default to apply to all of the maintenance points associated with the machine, unless otherwise excepted by a user or the like, thus allowing data to be defined and maintained at fewer points and also enforcing consistency.

Maintenance point parameters may include: the machine to which the respective maintenance point is associated, maintenance point type, point criticality. In the preferred embodiment, the specific maintenance point parameters and or machine parameters, identified and associated with a given maintenance point and or machine, are preferably fully configurable; and, as such, the selection, addition, deletion, or the like of specific parameters may be driven or influenced by considerations such as the type of the machine and/or maintenance point node, the type of the parent nodes of the machine and/or maintenance point node, the task templates associated with and/or expected to be associated with the machine and/or maintenance point, and the like.

Data may take the form of text, numeric values, or numeric values with units, or hierarchy associations (where the list of possible values may be explicitly limited to a set of legal or permitted values). Examples of data collected include: type of lubricant, oil volume, grease volume to apply, default operating state, machine criticality, periodicity at which each task is to be completed, target contamination levels for particles, water, alignment tolerances, previous values for inspection data such as temperatures, pressures, etc., materials required, and tools required.

The maintenance point type will preferably be defined globally such that each maintenance point is assigned a defined type to which other maintenance points may also be assigned. Such maintenance point types may be predefined, prior to identification of maintenance point parameters, or simultaneously with the identification of maintenance point parameters. For example, a catalogue of maintenance point types may be provided within which all maintenance point types for the facility 30 are expected to be found, or, maintenance point types may be globally defined as they are identified. In other embodiments, a combination of the two may be employed, such that a predefined catalogue of maintenance points may be supplemented as new maintenance point types are identified.

In the preferred embodiment, the maintenance point type is the combination of the type defined for any parent nodes of maintenance point, e.g., the machine and any other maintenance points higher in the respective hierarchy. In other embodiments, the specific type applied to the node itself can be used alone to identify the type of the node (maintenance point), or in combination with any of the parent node types. This method of identifying maintenance point types preferably eliminates combinatorial explosion of types, while still allowing for very specific types to be formed.

For example, a root machine node may have a type of "conveyor train", while one of its children may be an "electric motor". That motor may have a child machine of type "bearing housing". That same conveyor train may have a child machine of type "belt conveyor" (which will be hierarchically identified as being a specialized sub-type of a more general "conveyor"), which itself has a machine child of type "pulley" which itself has a child machine of type "bearing housing". For some analyses, it may be important to identify both the motor bearing housing and the conveyor pulley bearing housing as bearing housings. For other analyses, it may be important to distinguish one as being an "electric motor bearing housing" while the other as a "pulley bearing housing", for example, where the two types require different data to be collected or to be treated differently from a maintenance perspective.

The point criticality is similar to the machine criticality in that the point criticality is indicative of the relative criticality of a respective maintenance point, e.g. MP#1-MP#8, relative to other maintenance points, e.g. MP#1-MP#8 (FIG. 3). As with the machine criticality, the point criticality may be statically defined as a numerical indicator of relative importance, or may be dynamically defined, such as with an equation that derives an indicator of relative importance from other factors. For example, in FIG. 4, maintenance point MP#2 is given a point criticality of "4", whereas maintenance point MP#3 is given a point criticality of "1", indicating that the maintenance of the oil of maintenance point MP#2 is relatively more important to the operation of machine MP#50 than the screen of MP#3. It should also be noted that the maintenance point itself does not require a separate criticality unless the user wishes to override a higher level criticality assessment. If this is done, the maintenance point criticality is preferably very similar conceptually to the machine criticality.

Although tools required and materials required are parameters that are preferably associated with task templates, as described below, each and/or both may also optionally be associated with maintenance points and/or machines, especially where such tools and/or materials will be required irrespective of the task being performed on the maintenance point and/or machine.

In some embodiments, not all maintenance point parameters may be applicable to all maintenance points, e.g. MP#1-MP#8, and some maintenance points may be of such a nature that they do not require maintenance point parameters to be entered. In other embodiments, the machine and/or maintenance point parameters may include any number and/or variety of parameters, for example, relative or absolute position data of respective maintenance points, and/or any other data which may assist in the scheduling and/or management of maintenance tasks to be performed on the maintenance points. In cases where certain of the possible maintenance point parameters are not required or desired, determined by the type information and attachment of templates described above, the fields are preferably not prompted for. However, the method of data collection is not necessarily a critical factor in the methods of the present invention. As such, the data may be collected and/or organized in any suitable fashion so as to permit the implementation of the system 10 (FIG. 1) and/or the method 120 (FIG. 4).

The data indicative of machines M#50 and M#100, machine parameters, maintenance points MP#1-MP#8, and maintenance point parameters is preferably stored or otherwise recorded or preserved, for example, in the maintenance point database 74 (FIG. 2). As depicted in FIG. 5, the data indicative of the maintenance points MP#1-MP#8 and the respective maintenance point parameters may be stored in any suitable storage means or format. For example, the data may be hierarchical, tab delimited, delimited by one or more other characters, or may be in XML format or the like. It is important to note that hierarchically-related data need not be stored in a strict hierarchical data structure, so long as the data is stored with enough information for the system 10 to recognize and/or make use of the underlying relationships that define the various hierarchies that may be present.

Once the data is stored, the step 128 preferably includes updating the data in a continuous and real-time fashion. Specifically, the data indicative of machines, e.g., M#50 and M#100, machine parameters, maintenance points, e.g., MP#1-MP#8, and maintenance points parameters, is preferably updated on a continuous and real-time basis; or periodically and repeatedly updated and stored as necessary to keep the data updated to reflect or otherwise indicate or be indicative of current conditions in the facility 100. For example, the actual operating state of various machines will preferably be updated by various users and or electronic devices (FIG. 1), such that the system 10 may take into account the respective actual operating states of various machines to ensure tasks are optimally scheduled. For example, an oil drain plug will require periodic replacement of the oil. Since oil replacement generally requires the machine and/or maintenance point to be in non-operating or "down" state, it is important for proper and efficient scheduling of an oil change that the user and/or system implementing the method 10 be able to ascertain the operating state of the maintenance point and/or machine with which the oil drain plug is associated.

Figure 6:
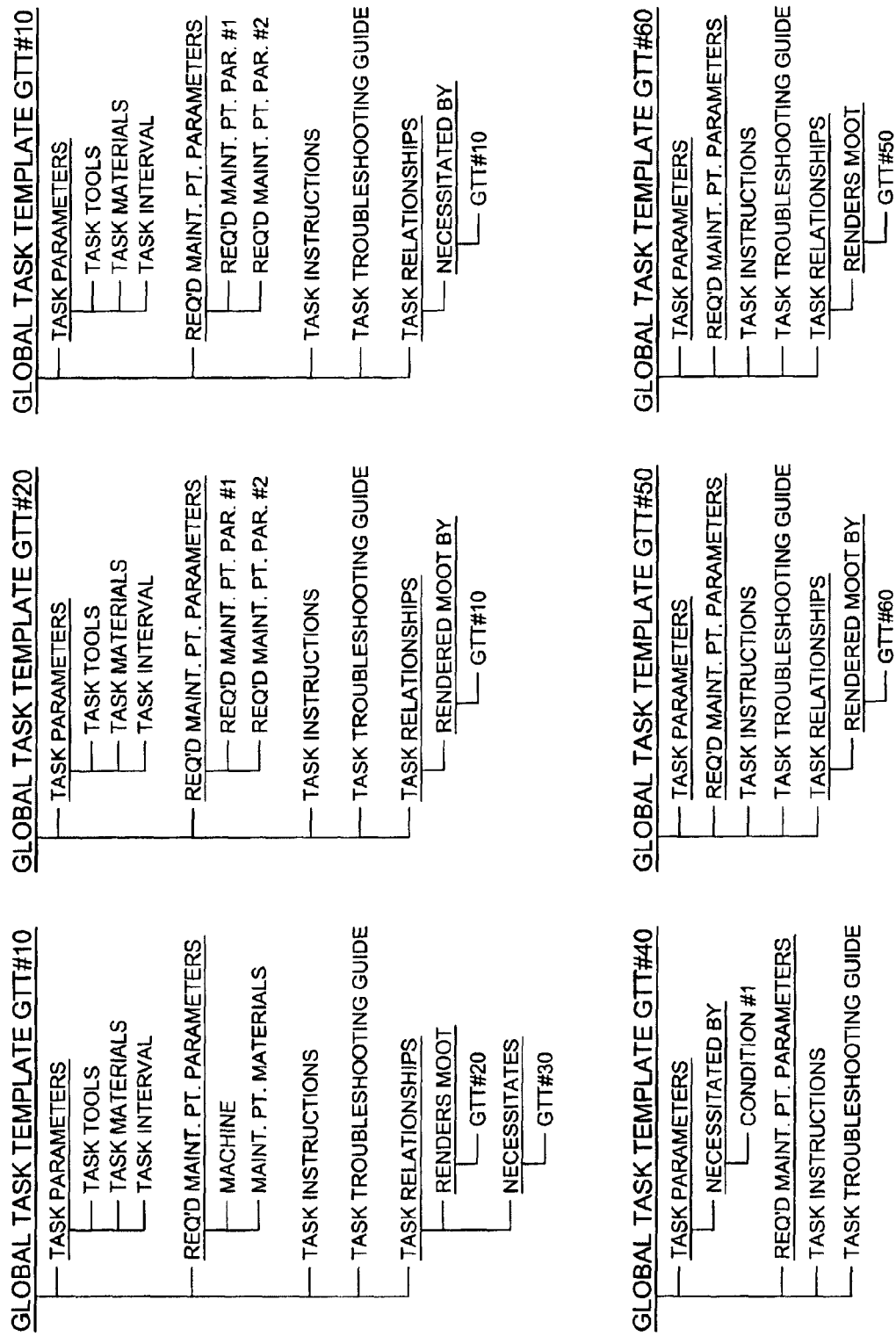
FIG. 6 depicts an exemplary organization structure for global task templates in accordance with the present invention.

Referring now to FIGS. 4 and 6, as mentioned above, in the step 132, global task templates are preferably globally-defined, catalogued, organized, stored, and/or maintained. As best shown in FIG. 6, the global task templates are each preferably provided with a unique name and/or identifier, e.g., "GLOBAL TASK TEMPLATE GTT#10", one or more task parameters, one or more required maintenance point parameters, task instructions, a task troubleshooting guide, and one or more task relationships. The global task templates are preferably defined on a global basis, that is, so maintenance points, e.g. MP#1-MP#8 (FIGS. 3-4), requiring common tasks will preferably be associated with common templates. For example, if two maintenance points each require an oil change, a single oil change global task template will be associated with both maintenance points to define two maintenance task definitions, one for each maintenance point, as will be described in more detail below. In this way, a change to a global task template can quickly and efficiently effect a change to all individual maintenance task definitions defined by or associated with such a template.

A plurality of task parameters are preferably defined and stored for each task template. While this may be as simple as a list of data to be presented along with a global task template, in the preferred embodiment, the task parameters may also be embedded within the template as placeholders for specific values associated with respective maintenance points to which the global template is assigned. In such a system, the generic task template may be made more specific, for example, in a task definition, by substituting the machine and/or maintenance point parameter values in for the corresponding placeholders.

The task parameters are preferably those parameters that are common to the task template regardless of the maintenance points with which the template may be associated. Task parameters may include: task interval, required operating state, task-specific tools, task importance, task length or estimated length to complete the task, type of oil, part number for a filter, part number for a breather, total oil volume, re-grease amount, descriptive location where the lubricant shall be applied, alignment tolerance, volume of sample fluid needed, normal expected temperature, duration for which filtration should be applied, and/or required operating state. Certain task parameters may be aggregated and supplied to a user and/or technician when the task is performed in conjunction with other tasks, such as, for example: tools required, amount of each The maintenance point type is preferably indicative of the type and/or types of maintenance points with which the task template should be associated. The specification of the maintenance point type with each task template preferably permits and/or assists a user and/or the system 10 to more efficiently associate a task template with appropriate maintenance points. For example, the designation of a maintenance point type of oil cap for each of task templates for topping off oil, filtering oil, and changing oil, respectively, will preferably indicate to a user and/or the system 10 that these task templates likely should be associated with oil cap-type maintenance points.

The task interval preferably indicates the optimum and/or a default interval between successive completions of the maintenance tasks. In other embodiments, the interval may be specifically defined for each maintenance task definitions, and/or an additional multiplier and/or factor for adjusting the default task template interval may be defined with individual maintenance task definitions so as to adjust the default task template interval for specific maintenance points. In the preferred embodiment of the method 10, subsequent due dates for completion of the maintenance task associated with each task template is calculated by adding the task interval to the latest completion date, or date on which the task was last completed. For example, the next subsequent optimal due-date for a task template, having an interval of 45 days, at a given corresponding maintenance point is preferably: latest completion date+45 days. The task interval may also be defined in any suitable units, such as, for example, more practical considerations of machine fatigue such as actual and/or estimated operating hours, actual and/or estimated output units, actual and/or estimated operating hours at accelerated or extreme operating conditions, or the like. It is also important to note that some task templates may include tasks that are not performed on an interval basis, such as, for example, tasks that are only performed in response to a condition and/or tasks that are only performed once.

The required operating state preferably indicates that a corresponding maintenance point, e.g., MP#1-MP#8, must be in for the task to be completed. As will be appreciated by those skilled in the art, the operating state will generally indicate that the machine and/or maintenance point is operating or not operating. As such, a required operating state of operating or running indicates that the maintenance point, e.g., MP#1-MP#8, with which the task template is associated must be operating to properly complete the maintenance task. Conversely, a required operating state of not operating or down will indicate that the maintenance point must not be operating to properly complete the maintenance task. Additionally and/or alternatively, the required operating state may be defined in individual task definitions, which are described below. In such instances, the task template may provide a default value that may be changed when a task definition is created, and/or the required operating state may be solely defined when a task definition is created.

If the maintenance task is not dependent on the operating state of the maintenance point with which the task template is associated, then the required operating state value is preferably none. A required operating state value of none preferably serves two purposes within the system 10 and/or method 120. First, the lack of required operating state preferably indicates that the corresponding maintenance task may be scheduled without regard for the operating state of the corresponding maintenance point. Second, in some circumstances, the lack of required operating state preferably indicates that the operating state of a machine, e.g. M#50 or M#100, and or maintenance point, e.g. MP#1-MP#8 (FIG. 3), need not be monitored, thereby reducing the amount of time and/or effort that must be expended to monitor the actual operating state of machines and/or maintenance points that are not associated with any operating state-dependent tasks.

Taking into account the operating state required for a task and the current operating state of the equipment has at least two primary benefits. First, effort and capital is not wasted attempting to complete work that cannot be completed at a given time, and second, assignments need not be overloaded with more tasks than can be reasonably completed, such as to account for a percentage of tasks that may not be able to be completed due to an inaccessible or improper operating state of a machine and/or maintenance points.

Additionally, the operating state of a machine may be so highly variable that no assumption can be made about its current operating state without specific information. To this end, the system 10 and method 120 preferably provide much more flexibility than has been previously provided by other systems. For example, a virtual hierarchy or the like can be defined by the user to determine categories of "op state suitability & confidence" such that currently due tasks and/or tasks that will become due may be selected for completion at times when the respective machines and/or maintenance points are in, or are likely to be, in the required operating state, as will be described below. In a normal, default configuration, this may include such states as: definitely suitable, which may be defined as IF required op state NOT "none", then the required op state matches the actual operating state value (not a default); probably suitable, which may be defined similarly to the definitely suitable value, except explicitly known op states are excluded and we look at defaults instead; unknown; probably not suitable, which may be defined similarly to the probably suitable value, i.e., dependent on default op. state; and definitely not suitable, which may be defined similarly to the definitely suitable value, i.e. dependent on actual op. state.

A user may also wish to further break down the unknown category to represent varying degrees of probably running or not. By using this type of virtual hierarchy, as will be described in more detail below for queries and route plans with reference to FIG. 9, the user is preferably able to set their own minimum threshold and can even make it different for different types of work, such as, for example, relaxing the threshold for: types of work where the op state requirement is only a preference; different criticalities of machines, such where it is worth taking a shot with less certainty about operating state if the criticality or criticalities are very high; or any other criteria that makes sense given the operating environment and/or maintenance philosophy implemented in a facility.

The tools required for a specific task, or task tools, are generally tools required for a specific task to be completed. For example, a task template requiring oil to be filtered will generally require a filter cart. In the preferred embodiment, tools are associated only with task templates, rather than with individual machines and/or maintenance points. In order to avoid duplication, the system 10 preferably only displays a given tool once the user and/or tech, even if the same tool is required by more than one task definition included in the assignment. In one embodiment, these tool assignments are preferably handled by associating sets (degenerate hierarchies) of task templates that require particular tools. In this way, these associated sets may be accessed quickly and efficiently to determine which templates require certain tools.

The task importance preferably provides an indication of the criticality, similar to the machine and/or maintenance point criticalities described above, of a respective task template relative to other task templates. More specifically, the task template preferably indicates a relative measure of the task's ability to avoid the problems associated with failure and/or to avoid failure. For example, a task template given a task importance of "3" indicates that the task template is relatively more important, or has a relatively higher priority or urgency, than a task template with a criticality of "2".

As with machine criticality and maintenance point criticality described above, the task importance may be statically expressed as a numerical indicator of relative importance, or may be dynamically defined, for example, as an equation, or virtual hierarchy, preferably taking into account the association of various parameters to other virtual and/or concrete hierarchies to derive an indication of task importance from other factors such as environmental conditions including temperature, humidity, or the like that may have an effect on the maintenance point types to which the task templates are assigned. For example, dusty conditions may increase the importance of cleaning and inspecting, and/or replacing air filters, or higher temperatures may increase the importance of topping off, filtering, and or changing oil. Additionally, business and/or economic concerns may affect various task criticalities. For example, an increase in the price of replacement bearings may increase the criticality of inspecting and greasing bearings.

One important aspect of the task importance is the flexible nature with which these factors can be determined and/or considered in or by the system 10 and/or the method 120 through the treatment of virtual hierarchies and sets at any point in such a virtual hierarchy or set. In the preferred embodiment, virtually all data, including even continuous numerical variables, can be converted to discrete values or ranges and thus be used as hierarchies rather than numbers for use in this mechanism.

Finally, the task length or estimated length of time required to complete a task associated with a task template is also preferably defined for each task template. Defining estimated task lengths preferably enables the system 10 to estimate the amount of time required for each task and thereby limit an assignment to the number of tasks having the highest criticality, priority, and/or urgency that may be completed in a given interval of time. The efficiency of each task or group of tasks can preferably also be determined to determine populations that allow for the greatest amount of the highest priority work to be done in the shortest amount of time, which may be especially useful when a facility is temporarily or permanently short-staffed.

For example, for a technician having an eight-hour shift with a one-hour lunch and two fifteen-minute breaks, there will be six and one half work hours available. Thus, with the estimated task length known for each task template, a number of tasks having an aggregate task length of approximately six and one half hours (or 390 minutes) may be selected. In some embodiments of the method 10, the estimated task length may be considered in conjunction with estimated travel time between task locations, for example, where position information for each maintenance point, e.g., MP#1-MP#8, is identified and/or stored such that estimated travel time may be estimated or approximated. In other embodiments, the task length may be defined for only a portion of the task templates.

A plurality of required maintenance point parameters may also preferably be selectively defined and stored for each task template. The required maintenance point parameters are preferably placeholders within each task template because the values are potentially unique to each maintenance point, e.g. MP#1-MP#8 (FIGS. 3-4), with which the task template may be associated. In this way, when a task template is associated with a maintenance point, there is an indication that these particular values may be important or useful to a task template, such that the data may be included for the respective maintenance point so as to be displayed to a technician or other user who will actually perform the maintenance task.

The exemplary task templates depicted in FIG. 6 are also provided with one or more task relationships as well. For example, task template GTT#10 is provided with a task relationship of "RENDERS MOOT" to task template GTT#20, and GTT#20 is provided with a task relationship of "RENDERED MOOT BY" to task template GTT#10. In this way, when task templates GTT#10 and GTT#20 are both associated with a single maintenance point and both become due at the same time, then task template GTT#20 will preferably render moot task template GTT#10, such that the system 10 will recognize that task templates GTT#20 need not be performed at the same time as task template GTT#10. For example if a maintenance point requires oil changes and oil top-offs at different periods, and both are due simultaneously, the oil change will necessarily require re-filling or topping off the oil, such that the task of topping off the oil need not be separately assigned. Such relationships may be defined directly in the task templates, or may be created and/or generated through the use of virtual and/or concrete hierarchies and/or sets, as will be described for queries and route plans below. The relationships are not limited to those actually depicted in FIG. 6, and may be defined and/or customized using any logical operators and/or relationships desired and/or required by a user and capable of implementation with the system 10. It should be appreciated that different relationships will have different semantic meanings, for example, "renders moot", "must be completed before execution possible", and the like will each have a defined effect.

As depicted in FIG. 6, the data indicative of global task templates, e.g., GTT#10-GTT#60, and the respective task parameters and required maintenance point parameters are may be stored in any suitable storage means or format. For example, the data may be hierarchical, tab delimited, delimited by one or more other characters, or may be in XML format or the like. It is important to note that hierarchically-related data need not be stored in a strict hierarchical data structure, so long as the data is stored with enough information for the system 10 to recognize and/or make use of the underlying relationships that define the various hierarchies that may be present.

Figure 7:
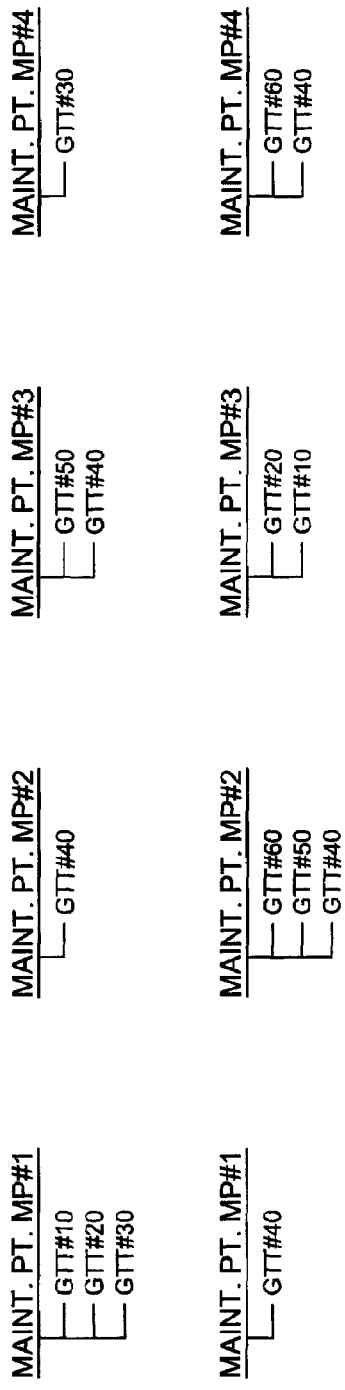
FIG. 7 depicts a plurality of exemplary tool and material groupings in accordance with the present invention.

By way of example, FIGS. 6A-6D depict an exemplary global task template constructed in accordance with the present invention Referring now to FIGS. 4 and 7, the step 136 of the method 120 includes a step 58 wherein maintenance task definitions (preferably associations between maintenance points and task templates) are preferably defined, catalogued, organized, stored, and/or maintained. The maintenance task definitions are preferably generated by associating, manually and/or automatically, each of the maintenance points, e.g., MP#1-MP#8 (FIG. 3), with one or more appropriate global task templates, e.g., GTT#10-GTT#60 (FIG. 6). Due to the preferred storage of maintenance task definitions as an association of a maintenance point and a task template, each time an individual maintenance task definition is accessed, evaluated, displayed, and/or the like, such maintenance task definition is preferably dynamically generated, in whole or in part, from the plurality of maintenance point parameters of the at least one maintenance point and from the plurality of task parameters of the at least one task template.

As described above, task templates, e.g., GTT#10-GTT#60 may be associated with maintenance points, e.g., MPP#1-MPP#8, with corresponding maintenance point types, or may be associated with any number and or combination of parameters and/or logical relationships, such as with virtual and/or concrete hierarchies and/or sets, such as is described in more detail below for queries and route plans. In some embodiments, the association of maintenance points with task templates will be completed through a manual consulting and/or analysis process.

In some embodiments, the association of task templates may be automated in any level of complexity. Specifically, for the automation of such an association process to be effective, it will generally depend on multiple maintenance point parameters, and/or multiple task parameters, in addition to merely a point type designation. As will be described in more detail below, such parameters may be defined in queries and/or hierarchies. It should also be noted that, in many practical implementations, maintenance task definitions (associations between maintenance points and task templates) will be manually entered or created, as will be described in more detail below.

By storing the maintenance task definitions as associations rather than complete sets of data, the various parameters associated with each maintenance points and task template may be updated and/or changed in real time and/or in a faster and more efficient manner than previously available in the art. Preferably, this updating and changing is accomplished by not storing the contents of the definition (except for the association) in a concrete form, such that the data is dynamically extracted as necessary, for example, from the maintenance point database 74 and the global task template database 78 (FIG. 2). If done this way, little, if any, data needs to be updated in the maintenance task definition itself, as relevant data will be merged from the maintenance point and global task template, preferably in real time, when the maintenance task definition is accessed, viewed, and/or evaluated.

Additionally, each maintenance task definition is preferably assigned an initial completion date from which to calculate the next subsequent optimal due date on which the task is due. For example: completion date+interval=optimal due date. Such initial due dates may be defined for individual maintenance task definitions, for all maintenance task definitions, or for certain classes of maintenance task definitions, such as may be defined by various task and/or maintenance point parameters. Once individual maintenance tasks are completed, the corresponding maintenance task definitions are preferably updated with the recent actual completion dates, such that later subsequent optimal due dates may each be calculated from an actual completion date rather than the optimal completion date, so as to maximize the efficiency of scheduling of maintenance personnel.

It should be noted that some tasks may be done on a conditional basis, i.e., in response to a predefined condition. Such condition-basis tasks do not have a need for the completion date, as they will not be due until triggered by the condition. Nevertheless, in some embodiments, it may be desirable to store a completion date, for example, to track and or monitor the existence of the triggering condition. Additionally, tasks scheduled on a non-calendar interval, such as operating hours, do not have a need for a last done date, though they do require the number of operating hours since last completed. In order to accomplish this, a reading from an hour meter may be recorded, and or some other reference value may be recorded so as to determine or derive the non-calendar interval so as to schedule the next performance of the task definitions. Also, modification tasks, which may modify a machine into a new configuration generally do not require a completion date as they are generally due immediately and need not be repeated.

Calendar interval tasks are also preferably associated with or assigned a tolerance in addition to the nominal interval, such that the task may become eligible for completion at [last done]+([nominal interval]−[early tolerance]); and/or may become late at [last done]+([nominal interval]+[late tolerance]). The scheduling tolerance allows planners to plan ahead and time shift work from periods of high activity (either from a man power or tool availability standpoint) to a close alternate period of low demand or to group a larger amount of similar work together; helping to eliminate what is commonly known as the "load balancing" problem. In contrast to systems having mechanisms to divide routes into smaller units to solve this problem, tolerances allow for implicit, natural load balancing that self-corrects when combined with a prioritization scheme. Dynamic route plans, as will be described in more detail below, allow work to be time shifted and still be completed with similar work that maximizes worker efficiency. Additionally, the implementation of such tolerances will be described in more detail below with reference to FIG. 12.

Additionally, where a task definition is closed as incomplete, a new instance is preferably created that carries over the due date criticality, priority, and/or urgency from the original instance at [last done]+(2*[nominal interval]−[early tolerance]). This allows for accurate compliance to plan metrics to be generated such that a single task missed multiple times impacts the metric to the appropriate degree.

As depicted in FIG. 7, maintenance task definitions are preferably stored as associations such that compilations of data are generated anew by the dynamic interaction of the maintenance point database 74 and the global task template database 78 (FIG. 2) each time the maintenance task definitions are accessed and/or viewed. The data indicative of the maintenance task definitions, i.e., associations between maintenance points and global task templates may be stored in any suitable storage means or format. For example, the data may be hierarchical, tab delimited, delimited by one or more other characters, or may be in XML format or the like. It is important to note that hierarchically-related data need not be stored in a strict hierarchical data structure, so long as the data is stored with enough information for the system 10 to recognize and/or make use of the underlying relationships that define the various hierarchies that may be present.

Figure 8:
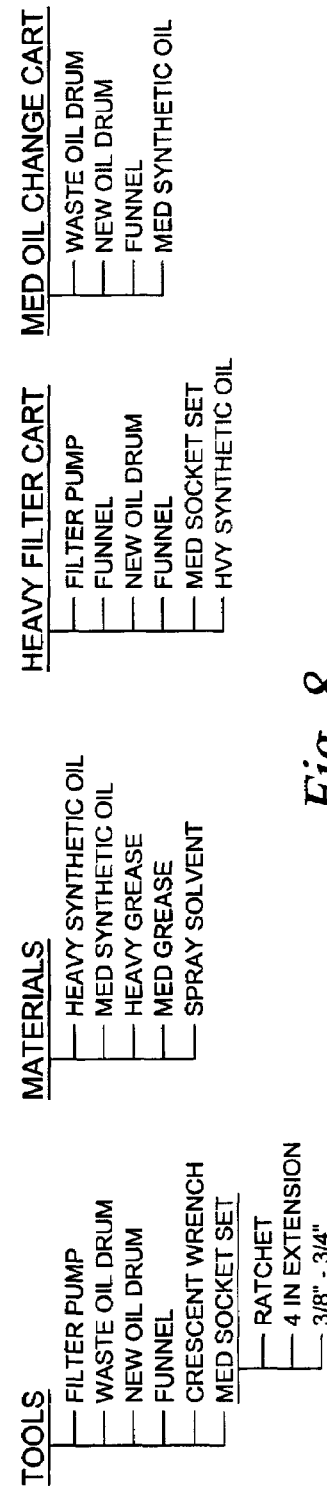
FIG. 8 depicts a plurality of exemplary maintenance task definitions in accordance with the present invention.

Referring now to FIGS. 4 and 8, in the step 140 of the method 120, data indicative of tools, materials, and groupings thereof is preferably defined, catalogued, organized, stored, and/or maintained. Such data may also be considered, for the sake of consistency, as tool and material parameters. In the preferred embodiment, tools and material are preferably defined sets or degenerate hierarchies. The individual members of these sets may then be associated with separate virtual and/or concrete hierarchies and/or sets, for example, "HEAVY FILTER CART" or "MED OIL CHANGE CART", wherein each hierarchy and or set may contain a number of individual tools and/or materials. In this way, a user and or the system 10 implementing the method 120 can efficiently ascertain which tasks may be performed by a technician having a given cart. That is, which maintenance task definitions only require tools and/or materials that are in a given hierarchy or set.

While tools required are preferably associated with a task template, a machine and/or maintenance point may include parameters which modify a tool designation within the system 10. For example, a tool may be the item used to carry the lubricant (grease gun, spouted top-up container, oil drum). As such, a grease gun with lubricant A is a different than a grease gun with lubricant B, and so the lubricant specified for the machine (which is a hierarchy association to enable its use in filtering) modifies the tool such that a maintenance task definition requiring a grease gun and a heavy grease will preferably be associated with a grease gun filled with heavy grease.

The tool and material associations are preferably made and/or defined with a query, thus making it a virtual relationship. In one preferred embodiment, each tool is given its own degenerate hierarchy (set) that indicates the tasks that have that tool as a requirement. Users will find that often adding a new task template or a version of a task template, provided it is positioned properly in the task template type hierarchy, does not require editing the tool query(s), however if entirely new categories of tasks are added to the system or new tools must be considered the query can be defined just like any other in the system. Although such associations may be defined in hierarchal fashion, when saved as queries, the query structure is preferably saved in text, XML or other large binary format, either in separate files or in a single field of a database.

Additionally, and as will be described in more detail below for queries and route plans, various relationships, virtual and/or concrete hierarchies, virtual and/or concrete sets, and/or any other suitable methods of organization may be employed for defining relationship between the various parameters and or hierarchies of any of the data defined, identified, stored, and/or maintained in the data module 124 of the method 120 (FIG. 4).

Figure 9:
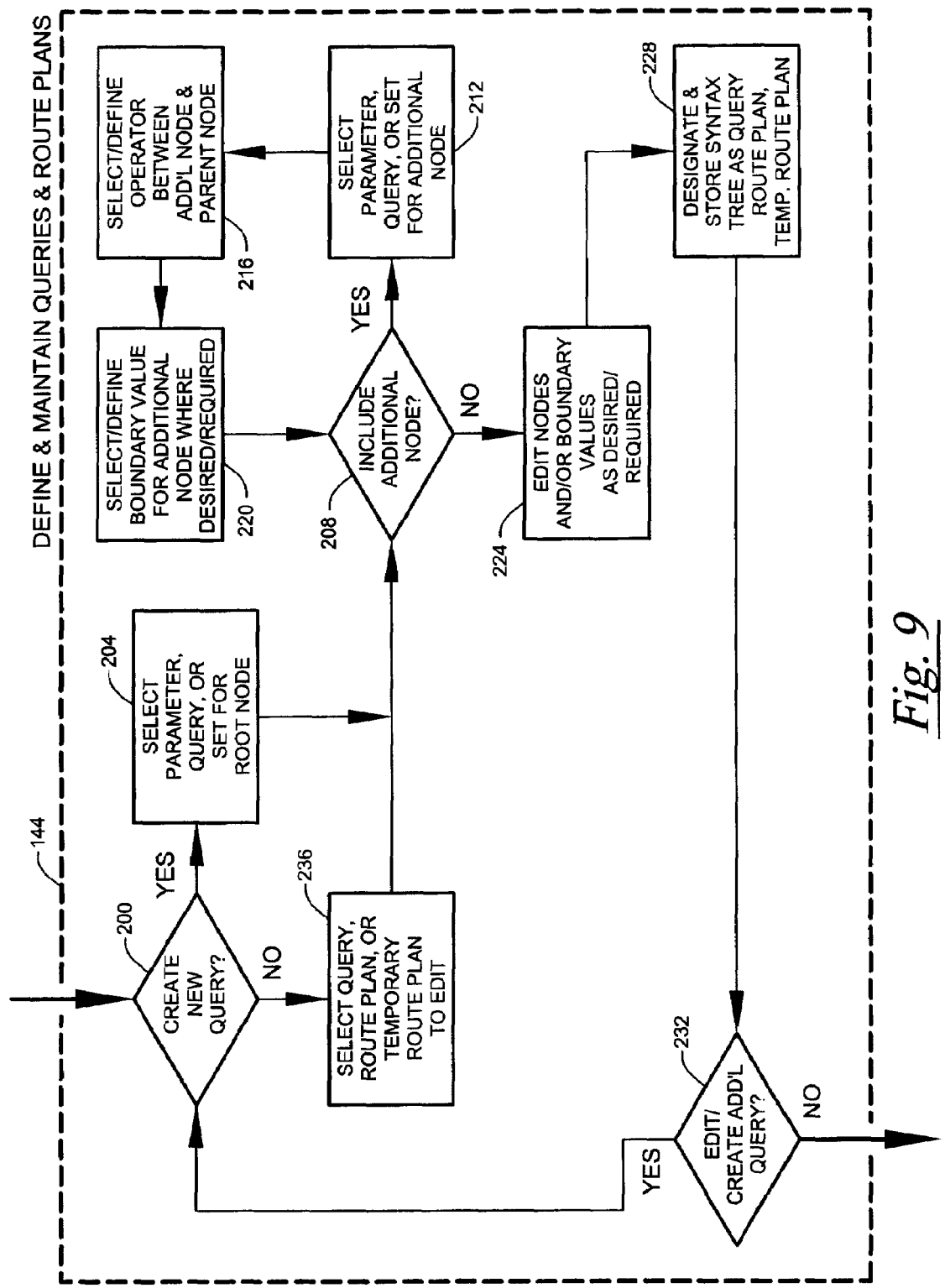
FIG. 9 is a flowchart illustrating additional detail for the process of defining and maintaining queries and route plans in accordance with the present invention.

Referring now to FIGS. 4 and 9, the step 144 of the method 120, conceptually corresponds to the query design and evaluation engine 94 or "query engine" 94 (FIG. 2). Generally, in step 144, queries, route plans, virtual hierarchies, and/or virtual sets are preferably defined, catalogued, organized, stored, and/or maintained that can be dynamically applied to the data maintained in data module 124. A "query", as herein described, preferably includes a plurality of conditions and operators, e.g., filter criteria (such as parameters and the like) and logical relationships between such filter criteria, that dynamically filter and thereby select maintenance task definitions to include in an assignment based on the most current values, relationships, and associations maintained in the data module 124 of the method 120 (FIG. 4). Stated otherwise, a query preferably selectively includes maintenance task definitions matching the query and selectively excludes maintenance task definitions not matching the query. In the preferred embodiment, such parameters and relationships are defined in a syntax tree or syntax tree-like structure having a root node or primary node generally having one or more dependent or child nodes. A "route plan" is preferably a query that is sufficiently developed to be reused to generate assignments; and an "ad-hoc route plan" or "temporary route plan" is preferably a query that is generated and used to develop an assignment, but that a user has not yet designated for reuse; each of which may generally be referred to as a query. An "assignment" is preferably a set of maintenance tasks that have been selected and compiled for completion.

In general, in the step 144, the system 10 and method 120 of the present invention preferably allow the use of higher-level language constructs to encapsulate more intuitive, practical, and nuanced logical patterns, many of which are not expressible with previously-known maintenance management systems. Such higher level language may often comprise compound expressions having various combinations more basic operators, such as, for example, AND, OR, NOT, and the like. For example, the operator of "A EXCEPT B" is easily represented by "A AND (NOT B)", however the former is closer to the user's thought process and produces a more intuitive and slightly more compact query.

A more complex example is the operator of "IF A ONLY THEN MUST ALSO BE B". In this case elements are considered part of the set regardless of their membership or lack of membership in A, however if an element is a member of A, only then do we wish to impose some constraints on its properties, expressed by condition B. This is fully expressible with only base logical operations, e.g., "(A AND B) OR (NOT A)"; however, may require complexity that is, in most cases, beyond the capabilities of typical users. A similar construct added was "IF A THEN MUST BE B, OTHERWISE MUST BE C" which is computed as "(A AND B) OR ((NOT A) AND C)".

Combining various such operators and combinations thereof, a user of the system 10 and/or method 120 is preferably enabled to generate meaningful expressions of the tool requirements and/or any other desired constraints on an assignment in a practical and usable way, as described in the following example.

If the population of possible tools (which in a traditional system would be presented within a single list) includes: filter cart, waste oil container, drum of oil, grease gun, sample pump, and spouted top up container; then it may be reasonable to want to perform all maintenance tasks that can be accomplished with any combination of the first three of the tools on the list, i.e., filter cart, waste oil container, and drum of oil.

A filter cart is required for portable filtration tasks as well as performing an oil change on larger volume systems with strict contamination control requirements (to facilitate adding pre-filtered oil to the system). A waste oil container is needed to perform any drain and fill, but it is not needed for portable filtration. The waste oil container may also be used without the filter cart to drain excess oil (or water) out of a system. A drum of oil may be needed for the oil change, but none of the other activities. In concert with the filter cart, though, a technician could use the drum of oil to top up or top off systems and/or maintenance points that have lost some oil.

There are other maintenance tasks a technician could perform that require none of these tools, for example, visual inspections. Due to limitations in any person's ability to carry many items, though, it may be important to exclude tasks that require the grease gun, the sample pump, or a spouted top up container. The system 10 preferably also recognizes that for maintenance tasks involving the use of the filter cart, the tasks included in assignment are should preferably be restricted to those associated with maintenance points using compatible lubricants. Thus, where an assignment includes the filter cart, the system 10 preferably limits, and/or permits a user to limit, its use to machines and/or maintenance points requiring the same or compatible lubricants (to avoid incompatibilities with other base oil types) and/or a single type of additive package (such as a neutral R&O). Similarly, if a user wishes an assignment and/or a route plan to include the oil drum (such as an oil change or a top up), then the system preferably matches the lubricant to the machine and/or maintenance points precisely.

Additionally, the system 10 preferably permits a user designing a route plan, query, or assignment to include other conditions as well. For example, it may be more efficient to perform a plurality of maintenance tasks within a tightly-constrained geographic area, such that a technician would spend a greater fraction of time completing tasks rather than walking. While in the area, it may also be preferably for the technician to complete as many maintenance tasks as is possible, with less or no regard for the task interval or the like, such as to reduce the number of times a technician will have to go to that location.

In order to schedule such tasks in the most efficient manner, as well as to effectively balance the loading of various tasks, the system 10 is preferably programmed and/or otherwise adapted to determine which tasks are due at a given point in time. Because the number of technicians available is generally limited, the amount of work time for each is also limited, and the number of maintenance tasks may often exceed the number that may be completed with such limited resources, the such tasks will generally be scheduled more efficiently where assignments given to technicians include maintenance tasks having a priority or urgency above a sensible threshold. Thus, the system 10 is preferably programmed and/or otherwise adapted to determine, calculate, and/or otherwise derive various criticality, priority, and/or urgency metrics and/or values so as to prioritize or rank various maintenance task definitions, queries, and/or route plans accordingly.

Additionally, to avoid assigning a maintenance task to a technician when the corresponding machine and/or maintenance point is unlikely to be in the required operating state, the system 10 preferably limits an assignment to maintenance tasks corresponding to reasonably-likely operating states of respective maintenance points.

By allowing users to construct a free form query using higher level logical constructs such as ALL OF, ANY OF, NOT, EXCEPT, IF THEN, and IF THEN ELSE, the system 10 and method 120 enable these concepts to be clearly expressed and used.

Referring now to FIGS. 9 and 10, FIG. 9 depicts a more detailed embodiment of the step 144 (FIG. 1) and FIG. 10 depicts a number of exemplary queries generated thereby. As best shown in FIG. 9, the exemplary embodiment of the step 144 preferably begins with a step 200, wherein a user selects whether to create a new query. If the user selects to do so, the method 120 preferably proceeds to a step 204 wherein a user is prompted to and/or selects a value for the root node of the query, e.g., a condition, operator, compound operator, parameter, existing query, virtual and/or concrete hierarchy and/or set. Upon selection of a value for the root node, the method 120 preferably proceeds to a step 208, wherein the system 10 prompts the user and/or the user selects whether to include an additional node or level in the query.

If the user chooses to include an additional node, the method 120 preferably proceeds to a step 212, wherein the system 10 prompts the user to and/or the user selects a value to include in the additional node, e.g., a condition, operator, compound operator, parameter, existing query, virtual and/or concrete hierarchy and/or set. Upon selection of a value, the method 120 preferably proceeds to a step 216, wherein the system 10 prompts the user to and/or the user selects and/or defines an operator or logical relationship between the root node and the additional node, and/or between the additional node and another node within the query. Once the user has defined the operator and/or logical relationship therebetween, the method 120 preferably proceeds to a step 220, wherein the user is prompted to and/or selects or defines a boundary value for the additional node, where desired and/or required. For example, the user may select to limit the node to a certain number of results returned, such as, for example, no more than 100 results. Alternatively, the user may decline to define boundary parameters, essentially limiting the results of the node and/or query to the combination of limitations resulting from the nodes within the query as a whole.

Upon the user defining or declining to define a boundary value or parameter the method 120 preferably returns to step 208, wherein the user is once again prompted to and/or selects whether to include an additional node. When the user is finished adding additional nodes, the user selects not to include any additional nodes; and the method 120 preferably proceeds to a step 224, wherein the user is preferably permitted to view the query, in whole or in part, and edit nodes and/or boundary values as desired. In one preferred embodiment, the system 10 permits the user to track the results of edits in step 224 in substantially real-time, such as by displaying the result of an edit visually, so as to permit the user to edit the parameters, values, operators, and the like to more easily achieve desired results.

Additionally, the user is preferably permitted to selectively define and/or edit boundary values/parameters for the query as a whole. In addition to the boundary parameter, the system 10 also preferably enables the user to define and/or select a target parameter to optimize. For example, the users may elect to have the system select the most efficient, the most urgent, or the most overdue, or other parameter(s).

The boundary parameter may also be applied loosely, such that allowed overages are permitted, such as to ensure that enough work is provided to cover some degree of unexpected lack of availability or completion of work faster than expected. The system 10 preferably allows the configuration of an over/under range on an absolute or percentage basis. For example, if an assignment taking 4 hours is desired and the over/under is set to 20%, then the system will select the best members to fill 4.8 hours. However, the system 10 will also preferably appropriately order and/or otherwise identify the tasks having the lowest relative priority extending beyond the 3.2 hour mark.

Once the user is satisfied with the query in step 224, the method 120 preferably proceeds to a step 228, wherein the user is preferably prompted to and/or designates and stores the query (syntax tree) as a query, a route plan, or a temporary route plan. In some embodiments, the system 10 may store the query automatically and/or provide a default designation. The method 120 then preferably proceeds to a step 232, wherein the user is prompted to and/or selects whether to edit or create additional queries.

Upon the user selecting to edit and/or create additional queries at the step 232, the method 120 preferably returns to step 200, wherein the user is once again prompted to and/or selects whether to create a new query. When the user selects not to create a new query, the method 120 preferably proceeds to a step 236, wherein a user is prompted to and/or selects an existing query (query, route plan, or temporary route plan) to edit. Upon the user selecting an existing query to edit, the method preferably proceeds to step 208, described above, wherein the user is prompted to and/or selects whether to include an additional node, and the method 10 then proceeds to either step 212 or 224, as described above.

Returning now to step 232, when a user chooses not to edit or create an additional node, the method 120 proceeds out of the step 144, to the step 148 (FIG. 4).

Parameters, sets, and/or hierarchies used to construct such queries may be associated with the maintenance points, task templates, tool and material groupings, or individual task definitions; or may be defined and or derived from any data within the system 10 and/or method 120 that may increase the efficiency and/or effectiveness of the scheduling described herein. However the sources, relationships, and/or associations of such data are preferably discoverable and/or viewable to the user when defining the query.

Because the complexity described herein may be generally too time consuming to set up in an ad-hoc fashion on a daily basis, the system 10 and method 120 of the present invention preferably include a mechanism to save the structure of the query and any number like it for repetitive reuse simply by giving it a name. Users are thereby able to treat the query as though it were a fixed conventional route and compare its contents against others to determine which such query should form the basis of the current day's assignment. Used in this way assignments can be generated in substantially less time than that required by prior systems; and indeed in no more time than a static route approach, with the added advantage that changes in machines, maintenance points, task templates, task definitions, or parameters associate with any of the foregoing, will not necessarily require any edits to route plans. Specifically, the results of the query will simply be updated to reflect the changes the next time the query is executed or applied. Additionally, sub-sections of queries can also be named and reused in multiple larger queries, reducing the effort required to produce new queries.

By way of example, FIG. 10 depicts several exemplary queries constructed in accordance with the present invention. It is important to note that such queries may include other queries as values in their respective nodes. For example, the query entitled "IF FILTER CART, THEN NON-GROUP V R & O" includes two queries nested within its structure. Additionally, multiple queries may be joined at their respective route nodes. For example, if the queries entitled "DUE & UNASSIGNED" and "AT/ABOVE DEFAULT THRESHOLD URGENCY" were joined at their respective root nodes with an "OR" operator, then all results fitting in either of the queries individually would be included in the resulting combined query.

In the preferred embodiment of the method 120, any number and/or type of queries and/or route plans (FIG. 8), may be generated and stored, such that they may be subsequently accessed and applied, and/or variety of queries and/or route plans may be generated therefrom at any given time. Additionally, subsequent queries and/or route plans may be based upon previous queries and/or route plans and/or combinations thereof. Similarly, subsequent queries and/or route plans may be defined, in whole or in part, by combining previous queries and/or route plans.

Additionally, queries and/or route plans may be used to define future assignments, separate from their (queries and route plans) use as a filter for other assignments. For example, in such a use, it may be appropriate to explicitly include or exclude individual tasks within the query. This permits the query and/or route plan to dynamically adjust as work is completed, cancelled, redesigned, or triggered after the query and/or route plan was designed. After an assignment generated from a query and/or temporary route plan is completed, a user may decide that it was a good collection of work to repeat, and so designate the query as a route plan, and/or retroactively re-create the route plan from the assignment, such that it may be repeated in the future. Also, as is repeatedly referred to above, such queries may be used to define virtual and/or concrete hierarchies and/or sets within above-described databases.

Several methods and/or forms are available for displaying or communicating the design of a query. One such form is in a tree-based representation that represents the combination of terms in a form known to computer scientists as a syntax tree. This is a relatively intuitive graphical format, and as such, is preferably used in the system 10 and method 120. It is important to note that the operators themselves may have multiple equivalent expressions in language and the structure should be considered separate from the wording chosen.

Another such form is in a text-based representation that presents the criteria in a pseudo mathematical format using logical operators in the form of a Boolean query string. The operators themselves may have multiple forms and the structure should be considered separate from the symbols or syntax employed. Examples of this form, as well as being included above, include the following: (A OR B); (A|B); and (A^B). A third form is a notation-representation using set theoretic operations to define relationships between sets that themselves may be defined with set theoretic definitions. One examples is: $\{x \in newQueryName | x \in A \cap B\}$. Yet another form is a natural-language representation. This is another preferred form, and may be used in conjunction with the tree-based form discussed above. One example is: ANY OF A, B.

By way of example, an exemplary query generation process will be described herein. It should be understood that the exemplary query generation process may be used in conjunction with the exemplary steps described above with reference to FIG. 9, or may be used separately with other embodiments of the method 120.

Initially, the process preferably may begin with a blank query to be built from scratch; from an existing query to be edited or saved under a new name (such as, while preserving the original); or may be done in a wizard-style incremental approach in which the query is built up from building blocks.

Assuming the user begins with a blank query, the user is preferably presented with a number of options. They may select a condition or an operator. A condition can be a saved query/set, the former of which is generally virtual, while the latter may be virtual or concrete, or a hierarchy. Some exemplary operators preferably included are ANY OF (which is the analog of logical OR or set union), ALL OF (which is the analog of logical AND or set intersection), EXCEPT, IF THEN, or IF THEN ELSE. As mentioned above, the system 10 preferably enables a user to join, nest, or otherwise combine operators to form compound operators.

Some operators treat all operands equivalently and may have two or more such that the order of the operands does not affect the expression. Such operators include ANY OF and ALL OF. ANY OF evaluates to true for a given candidate member (and thus the candidate is included in the set defined having satisfied the requirements for membership) provided that it is a member of at least one of the sets listed as operands. ALL OF evaluates to true for a given candidate member provided that the candidate is a member of each and every one of the sets listed as its operands.

The other exemplary operators generally have a more structured use in that they have a fixed number of allowable operands and each has specific meaning in the expression. For example, EXCEPT requires two and only two operands. A candidate member is considered a member of the set when it is a member of the first and not a member of the second operand. IF THEN also requires two and only two operands. A candidate member is considered a member of the set regardless of its membership in the first, however if it is a member of the first, then it must also be a member of the second. It should be understood that if it is not a member of the first, it is included regardless of whether it is a member of the second. IF THEN ELSE differs in that it requires a third operand that does apply an additional condition on a candidate member that is not a member of the first operand.

Once the tree is non-empty, either through the addition of the first operator or condition, continued editing, or the loading of an already saved query; then any node can preferably be selected for modification. If a condition is chosen, then it may be modified by applying a NOT modifier to it, or it may be encapsulated in an operator which is then added above it, the original condition then becoming one of its operands. Applying a NOT modifier has the expected result of including any member that was not included before the modifier was applied. It should be understood that the union of the unmodified and modified set is the entire population, and that the intersection of the two is the empty set. If an operator is chosen it may then be modified with a NOT, be encapsulated by another operator, or have operands added to it (beneath it).

In the preferred embodiment of the system 10, at any time the query as a whole can be "saved" or "saved as", the former case the original form is overwritten with the new form, whereas in the latter case it is given a new name to be saved as and the original form is preserved under the original name. Additionally, at any time any non-leaf node of the tree other than the root can be "extracted", in which it is given a name and saved and it is replaced in the tree by the new name and its underlying structure hidden from view. This process continues until the user is satisfied with the structure of the query. Whenever a query is saved, its structure is preferably evaluated by the system 10 to ensure that its construction is legal, and an error presented to the user if it is not.

When a hierarchy is selected as a condition, another data entry mechanism is preferably utilized to minimize the input effort required. The entire tree structure of the hierarchy is presented and the user may choose to select nodes for inclusion or exclusion. When selecting for inclusion, the effect is to create a list of operands that will be placed under an ANY OF operator node. Similarly when selecting for exclusion, the effect is to create a list of operands that will be placed under a NOT-modified ANY OF operator node. Whenever the user selects a node that is not a leaf node, the user is implicitly selecting all of that node's children at any level of depth.

Once the user has made an initial set of selections the user may undo any of those selections or add additional selections of the same direction, as done originally, anywhere on the tree. The user may also make selections of the reverse direction on any child node of an already selected node of the other direction. This has the effect of encapsulating the result that will be returned within a EXCEPT operator, with the first operand being the pre-existing query representation, and the second operand being either a single condition (if only one was selected for the reverse direction), or an ANY OF operator, with all of the reverse selections as its operands (if more than one reverse selection was made). When the user is finished, the query representation is preferably returned to the tree and its root is placed at the point where the user previously made the hierarchy selection.

The non-tree-based approaches, especially the Boolean and natural language mechanisms, are less-structured, but fundamentally the mechanism is very similar, except there is more burden on the user to use proper syntax and limit themselves to proper structure. In the graphical approach, the only structural mistake the user is allowed to make is to provide an insufficient number of operands to a operator, as the system 10 preferably restricts all other illegal actions. In all cases, the system 10 preferably includes a lookup capability to look up available conditions and insert their proper (machine recognizable) identifier in the query, and may also be able to provide "code completion" assistance to help users with free-form input mechanisms.

Other hierarchies the may be useful for the creation of route plans in various facilities may include, but are not limited to: maintenance responsibility (such as along divisions in technician, group, or departmental responsibility for executing work); craft divisions; geographic boundaries; accounting divisions; skill sets; and the like. Other hierarchies may be based on combinations of these and other factors, such as, for example, a combination of maintenance and accounting responsibility. For example, some facilities may account for maintenance activities against cost centers; and thus, it may be more convenient to limit each assignment to covering only a single cost center to eliminate the need to track the time and materials used for individual or small groups of tasks. Nearly any criteria the user can imagine or identify as relevant to the division, scheduling, and/or management of maintenance tasks may preferably be created as one or more concrete and/or virtual sets and/or hierarchies for use in queries.

By way of example, an exemplary route plan is depicted in FIG. 11. In accordance with the description above, several of the nodes or levels within the exemplary route plan are based upon the queries depicted in FIG. 10, and thereby include the structure of those respective queries.

Figure 12:
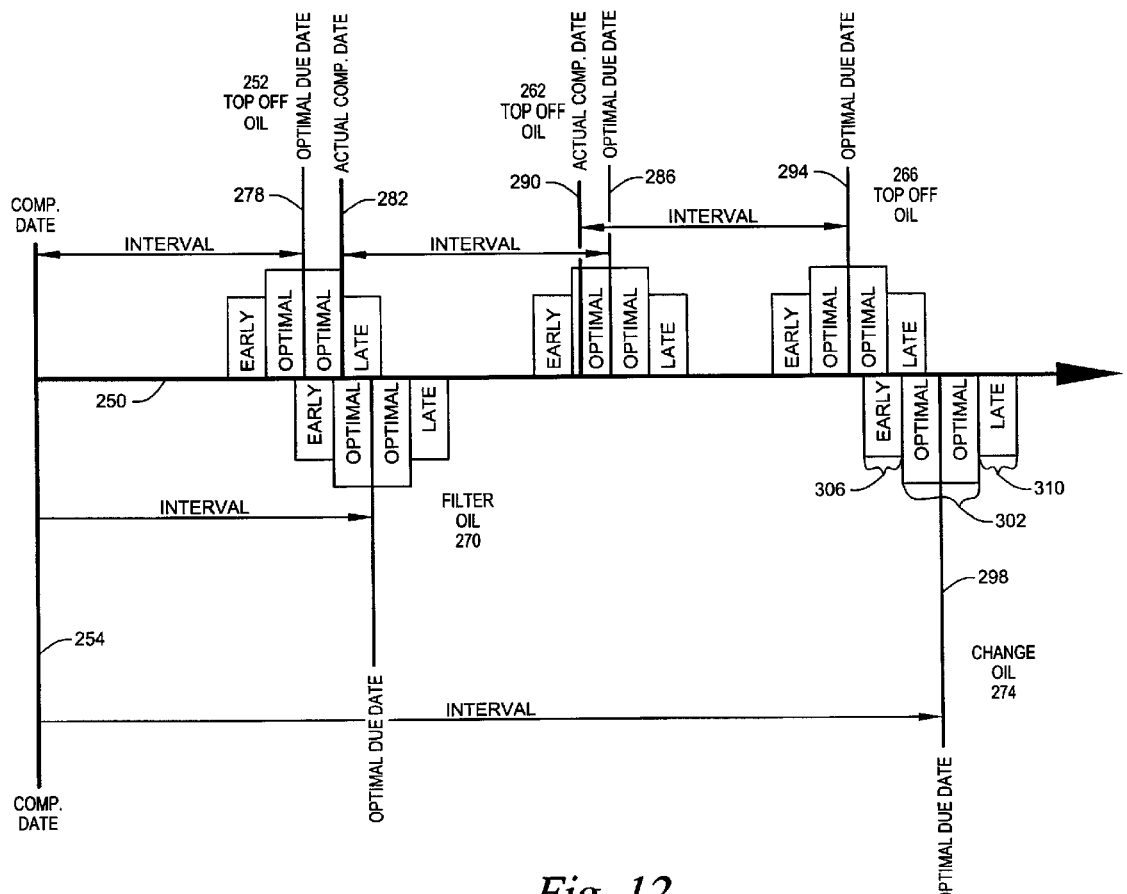
FIG. 12 depicts a timeline showing the relative temporal proximity of several exemplary task definitions in accordance with the present invention.

Referring now to FIGS. 4 and 12, in the step 148 of the method 120, one or more route plans and/or queries of step 144 are preferably applied to the data of the data module 124 to extract maintenance task definitions having desired parameters and/or characteristics in order to generate assignments for users and/or maintenance technicians. More specifically, the system 10 preferably identifies and extracts from the respective databases (FIG. 2) those task definitions that both are currently due and match the criteria specified in the route plan.

The maintenance task definitions are then preferably ordered according to relative urgency, priority, or the like, such that any boundary values of the route plan may be applied to the task definitions. That is, relative urgency, overall relative priority, or an indicator thereof, as defined or derived based upon predefined and/or user selections is preferably determined for each of the tasks, preferably taking into consideration one or more of the task importance, point criticality, machine criticality, operating state, and/or any other user-defined factors associated with each maintenance task definition. Such relative urgency or priority may be the result of a prioritization metric considering at least one of the machine criticality, maintenance point criticality, task importance, or the like. It will be appreciated that such a prioritization metric may be independent of the due date or the amount a task definition is overdue. More specifically, preferably only tasks currently due, or within a due window, as described below, are considered for inclusion in an assignment, such that the prioritization metric is only applied to tasks that are currently due. In the preferred embodiment, even where the due date or amount that included task definitions are overdue is considered in the prioritization metric, the prioritization metric is independent of whether or not the task definition is due, in that it is calculated or derived only after the tasks are selected for inclusion, dependent on whether or not they are currently due.

Once the selected maintenance task definitions are prioritized, any boundary values may be applied to limit the number of tasks included in the assignment. For example, if the route plan has a boundary value limiting the total aggregate task length to 200 minutes, the tasks with the highest overall priority will preferably be included in the selection until the aggregate task length reaches 200 minutes. Once the aggregate task length of the selected task definitions reaches 200 minutes, task definitions having lower overall priorities will be excluded.

In other embodiments, the ordering and/or prioritization of step 110 may take into account factors other than criticality, urgency, task importance, and/or the like. The method 120 preferably load-balances by taking into account task definitions currently due, or that will become simultaneously due within an acceptably-foreseeable time, on a common maintenance point. That is, in the method 120, when two tasks are due on a common maintenance point, e.g. MP#1-MP#8, the two tasks are preferably performed at the same time to so as to maximize efficiency by minimizing the number of trips that must be made to the same maintenance point, e.g., MP#1-

MP#8. For example, if an oil change and an oil top off at a single maintenance point are both due at a given time, but the oil top off has a lower relative urgency, the two task definitions will preferably be grouped together to ensure they are completed with a single trip; with the resulting group preferably being assigned, or associated with, either the highest relative urgency of the two, or an average or other derivation taking into account the relative urgency of each of the two.

Similarly, in yet further embodiments of the method 120, other dynamic route plans may be taken into account to ensure that efforts are not duplicated and that maintenance task definitions are properly load-balanced across maintenance resources. For example, where two maintenance task definitions are currently due, or will become simultaneously due within an acceptably-foreseeable time, where one maintenance task definition is included within a first dynamic route plan filter and another is excluded, and where a second dynamic route plan filter that will include both task definitions is scheduled within the acceptably-foreseeable time within which the two tasks will be simultaneously due; then the task that would otherwise be included in the first dynamic route plan filter may be excluded therefrom such that both task definitions may be included in the second dynamic route plan filter; provided, that the current time does not represent an abnormally-advantageous opportunity to perform work from an operating state perspective.

Additionally, where one maintenance task definition renders moot another maintenance task definition, the method 120 preferably excludes the maintenance task definition that is rendered moot. In one embodiment, this is accomplished via priority donation. More specifically, a task that renders another task moot is given the sum of its own priority plus those of all tasks it renders moot, thereby guaranteeing that the higher leverage task will always be given preference to the lower leverage tasks; provided, however, that tool, time, and operating state requirements do not force the completion of such tasks in a less-optimal method.

For example, where an oil change having an interval of 90 days becomes simultaneously due with an oil filtering having an interval of 45 days on a single given maintenance point, the oil filtering will preferably be recognized as moot and excluded from the application of the dynamic route plan filter. In such a case, the oil filtering maintenance task definition will preferably be updated with a completion data equal to the actual completion date of the oil change, such that the next subsequent oil filtering will occur at the proper interval from the oil change that rendered the oil filtering moot.

Another example would be the skipping of an oil change on a machine that is being rebuilt (the oil change is happening anyway). In the preferred embodiment, it is left to the user to define the dominance relationships as they see fit, on either a global task template basis, or on a more limited task definition by task definition basis, or by a query that takes information such as types and criticalities into account.

In operation, the system 10 preferably evaluates the query or queries for one or more route and the aggregate prioritization metrics for each are determined. The user is the preferably presented with a list of these by route plan results with the list sorted by the primary or selected priority measure. A user may then select to use one or more route plan results (often the one with the highest priority) "as-is" to generate one or more assignments, or as the basis for one or more more-focused assignments. With the ability to define and store multiple queries and/or route plans, users are preferably freed from needing to define an assignment via ad-hoc querying in most cases. Additionally, special-purpose queries and/or route plans may be created to deal with abnormal conditions, such as an outage for all or part of a plant, so that taking advantage of fleeting op state conditions is prioritized over absolute assignment efficiency, for example, by partially or fully ignoring geographic proximity.

The user may select to use the route plan as is, in which case the prioritization mechanism will preferably reduce the task definitions included in the route plan to a suitable number of task definitions by the various methods described herein. Alternately the user may select to apply additional query filters to the result, for example, to select a more geographically-focused assignment, or any other restriction that may improve the efficiency or desirability of the task definitions included by the route plant. Additionally, where the total expected duration is less than that desired for the assignment, the user may preferably elect to edit the query to relax the restrictions imposed by the various filter criteria and/or logical relationships between the filter criteria. Such relaxation of restrictions may preferably be completed in a manual fashion or through the use of what is known in the programming arts as a "greedy mechanism". Alternatively, the user may simply elect to generate a shorter assignment. In such an alternative, the user may further select another route plan to form the basis of another assignment, such as to fill the desired period. For instance, if users normally create 4 hour assignments, it may be preferable to leave elect not to modify the route plan so as to generate a two-hour assignment, and select a different route plan as the basis for a separate assignment for the other 2 hours. While this may seem inefficient where two assignments may have little in common; often, users may have a break that may create a natural point of separation between the two assignments.

Referring now to FIG. 12, principles for scheduling, load balancing, determining relative urgency, and/or prioritizing maintenance task definitions are illustrated. A timeline 250 is shown for purposes of conceptualizing the methods described. The timeline 250 is shown extending into the future from an initial completion date, represented by the axis 254, from which each of three maintenance task definitions are scheduled on a single maintenance point. As shown, the maintenance task definition entitled "TOP OFF OIL" has the shortest interval and is repeated three times, designated by the reference numerals 258, 262, and 266, respectively. The second maintenance task definitions, "FILTER OIL", is repeated once and designated by the reference numeral 270. The third maintenance task definition, "CHANGE OIL", is repeated once and designated by the reference numeral 274.

As mentioned above, for tasks with calendar-day intervals, the next subsequent optimal due date is preferably calculated from the initial or latest actual completion date. For example, the first optimal completion date 278 is determined by adding the task interval to the initial completion date 254. Actual completion date 282 of the task 258 is then recorded and the subsequent optimal due date 286 is determined by adding the task interval to the actual completion date 282, and so on, in like fashion for the second actual completion date 290 and the third optimal due date 294.

As shown, each of the exemplary maintenance task definitions 258, 262, 266, 270, and 274 is depicted with an optimal due date and several time windows defined around their respective optimal due dates, e.g. 278, 286. For purposes of clarity and brevity, the due date of only one maintenance task definition 274 will be described, with the understanding that the principles thereby described preferably apply to the other optimal due dates and time windows shown. The optimal due date for the maintenance task definition 274 is represented by the axis 298. As shown, the optimal due date 298 is accompanied by an optimal window 302, an early window 306, and a late window 310.

Each of the windows 302, 306, and 310 may be defined for individual maintenance task definitions, may be defined for all maintenance task definitions, or may be defined for classes of maintenance task definitions, such as may be established or determined with various parameters associated therewith, such as, for example, by defining a query that describes a population to which a supplied rule shall be applied. Additionally, each of the windows 302, 306, and 310 may be determined absolutely, e.g., two days, or relative to the various task intervals or other windows, e.g., 5% of the task interval or 50% of the optimal interval 302, either of which may be rounded to the nearest day or other suitable unit. For example, the optimal window 302 may be defined as plus or minus or minus one day from the optimal due date 298, plus one day and minus two days from the optimal due date 298, or in any other suitable fashion. Similarly, the early and/or late windows 306 and 310, respectively, may be defined together or individually relative to the optimal due date 298, relative to the optimal window 302, and/or relative to the other of the early window 306 and late window 310.

As described above, where two maintenance tasks are simultaneously due or will be become simultaneously due within an acceptable time, the two will preferably be grouped for efficiency. More specifically, this is preferably accomplished by identifying work included in the current scope (meets the query) that is above the priority limit, e.g., within the query or set as a boundary value, but that also satisfies the query requirements of a future assignment scheduled to be completed before the task will become late. In this way, the work is preferably gently time-shifted in deference of other work that is less-likely to be capable of completion with a future group of work. To this end, users may find it helpful to have a standing, recurring rotation of these assignments, not unlike what is traditionally done with conventional routes to maximize the ability to time shift work to when it can best be done on time.

For example, the time windows 302, 306, and 310 of the maintenance task definition 274 overlap the time windows associated with the maintenance task 266, such that the two maintenance task definitions 266 and 274 will preferably be analyzed to determine whether either of task definitions 266 and 274 renders the other moot, such that one may be omitted, as described above. If neither is rendered moot, the two maintenance task definitions 266 and 274 will be grouped with the relative urgency for the group determined in one of the manners described above.

Although in the embodiment of the method 120 herein described, for clarity and simplicity, it is assumed that all maintenance points are in the proper operating state for the maintenance tasks to be performed, in other embodiments, the system 10 and/or the method 120 will preferably take into account the operating state of the maintenance point associated with a given maintenance task definition, and exclude the maintenance task definition from the route plan, at any of the steps described above and/or below herein, if the maintenance point will not be, or has very little likelihood of being, in the required operating state. This is preferably accomplished through the use of the query and/or route plant design, as mentioned above. Alternatively, users may wish to exclude operating state and priority from their query designs and instead provide a default policy for these (still defined by the query mechanism) that the system will automatically apply to all queries used as the basis for an assignment.

Additionally, the method 120 may take into consideration an operating state criticality. That is, in the preferred embodiment, a user and/or system implementing the method 120 will preferably consider the likelihood that the required operating state will occur within the time windows surrounding the optimal due date, as described with reference to FIG. 11, and will correspondingly increase the operating state criticality to increase the task where appropriate. For example, if a given maintenance task otherwise has a relatively low urgency when the maintenance point is in the required operating state, but the probability of the corresponding maintenance point subsequently having the required operating state during the time windows surrounding the optimal due date is relatively low, the operating state criticality will preferably be increased to increase the probability that the maintenance task is completed while the maintenance point is in the required operating state, despite the otherwise relatively low urgency of the maintenance task. Unlike other criticalities described herein, the operating state criticality is preferably more indicative of the "fleetingness" or "rarity" of the required operating state. However, as with the other criticalities described herein, the operating state criticality may be defined either statically or dynamically. In some cases, the operating state criticality may be defined to have relatively greater or lesser weight than other criticalities, may completely trump other criticalities, or may be considered proportionately with other criticalities. A user and or system implementing the method 120 will also preferably be able to assign various relative weights to any combinations, subsets, or individual criticalities or classes of criticalities, urgencies, or priorities herein described.

The step 148 preferably further includes reordering or sequencing the selected maintenance task definitions prior to outputting the assignment to a maintenance technician or the like. In one preferred embodiment, and as most clearly explained with reference to FIG. 3, the maintenance tasks definitions are ordered in terms of relative spatial proximity to a reference point, e.g., 116 (FIG. 3). In the exemplary embodiment of the facility 100 of FIG. 3, each maintenance point MP#1-MP#8 may be positionally or spatially referenced to reference point 116. In one preferred embodiment, the maintenance tasks are prioritized such that a maintenance technician will begin at a maintenance point, e.g., MP#1-MP#8, relatively close to the reference point 116 and visit each maintenance point included in the route plan in such a fashion as to make a loop from relatively closer maintenance point to relatively farthest maintenance point, to another relatively closer maintenance point, such that the maintenance technician, or the like, begins a route plan near the reference point 116 and ends the route plan near the reference point 116, so as to minimize unnecessary travel time before or after the assignment.

In other embodiments, the maintenance task definitions may be sequenced in any desired manner, such as to increase efficiency or the like. For example, the system 10 also preferably permits a user to define one or more static orderings of machines and/or maintenance points, which orderings then used, in whole or in part, to produce the order. Such orderings may be within a particular location, with separate macro level orderings of the macro level locations themselves. Alternately this macro ordering can be accomplished via analysis of adjacencies and consideration of the start and end points to propose possible macro level paths. This could be combined with micro level orderings for each previous/next pair at the macro level for each location. In yet another embodiment, the user may manually order the path at the macro and or micro levels for a particular assignment and this information be stored such that the system learns which way the users prefer to walk the assignments. This could be further improved by using a portable device that includes the assignment information and records the order in which the technician actually walked to accomplish the same goal without a separate explicit ordering step. Additionally, the system 10 may flag a particular task as scheduled to be completed at a time that its fleeting op state opportunity has expired due to the default ordering and propose an alternate ordering for acceptance by the user, such as will allow the task to be completed within the limited window of opportunity.

The step 148 preferably also includes outputting an assignment in a form perceivable by a maintenance technician, user, or the like. For example, the assignment may be: printed out; displayed on a screen, such as on a laptop computer, notebook computer, desktop computers, personal digital assistant (PDA), cell phone, or the like; audibly provided to a technician, in whole or a sequence of parts; or in any other form in which a technician or other user may perceive it. In one preferred embodiment, the assignment is preferably output as an abridged textual version printed out or displayed via a portable computing device that allows the more detailed version to be immediately accessed.

An even more preferable embodiment of the assignment output nests tasks to be performed on the same maintenance point or higher level machine within each other, so as to eliminate steps that are common to various maintenance tasks to be performed on the same machine and/or maintenance point. This reduction in unnecessary duplication makes the assignment clearer and easier to read. The order in which tasks are embedded within each other and the position within the parent they are nested is defined by the task templates themselves and descriptive information, such as, for example, via special tags, and/or database- or file-stored relationships.

For example, modifying a fitting on the bottom of an oil sump necessarily requires the draining of the oil. When modifying the fitting is scheduled, it will normally be done concurrently with an oil change procedure, and thus the modification step will be inserted within the oil change procedure, after the oil is drained, but before the oil is replaced. Similarly, sometimes an oil change must be accompanied by a flush, which would be inserted at roughly the same point, but after the modification, such as to clean up any filings or contaminants introduced during the modification itself.

The assignment preferably includes the information necessary to permit a technician to perform each of the tasks on the route plan, and preferably, but not necessarily, excludes information that is not necessary for a technician to complete tasks included on the route plan. For example, the route plan may include and/or be output in conjunction with: any task and/or maintenance point parameters, and tool parameters, any other parameters inherently related to the method 120 or the underlying assets on which or with which the method 120 is performed, task instructions, troubleshooting guides, or the like. Where task instructions and/or troubleshooting guides are included, they are preferably included in shortened and/or abridged form so as to maximize efficiency and ease with which they may be accessed and/or transported by a technician, but also may be in full or non-abridged form.

Such a troubleshooting guide is preferably organized around directly-observable (or measurable) cautionary conditions. Under each caution, are preferably included a series of potential causes (one or more). Under each cause are preferably three sections, one containing a series of one or more corrective steps, another containing a series of one or more steps to perform if the corrective steps were successful in correcting the problem, and another containing one or more steps to perform if the corrective steps did not eliminate the problem, often including a note to attempt the next possible cause, or, if it was the last possible cause, to trigger particular follow-up actions, and usually abort completion of the procedure. In the preferred embodiment, this mechanism is extended to collect data-centric (quantitative or qualitative measurements or assessments) or general observations to be fed-back into the data module 124 (FIG. 4), for subsequent review, as described in more detail below.

Figure 13:
FIG. 13 depicts an exemplary format for assignment creation in accordance with the present invention.

By way of example, FIG. 13 depicts an exemplary assignments creation screen from a software and/or web implementation of the method 120, such as by the system 10 of FIG. 1. As shown, a user is preferably provided with a list of queries and/or route plans for which aggregate priority and/or urgency metrics and/or values have been determined, such that a user may choose to generate an assignment from one or more route plans and/or queries with the highest relative priority or importance.

Also by way of example, FIGS. 13A-13M depict an exemplary assignment generated in accordance with the present invention.

As best shown in FIG. 4, once the assignment is output at step 148, the method 120 preferably proceeds to a step 152, wherein the selected maintenance tasks included in the assignment are performed. As will be appreciated by those skilled in the art, one or more maintenance technicians or the like are preferably assigned the route plan such that the maintenance tasks defined by each maintenance task definition may be completed. The method 120 then preferably proceeds to a step 156, wherein the user and/or technician provides feedback, where necessary, regarding selected maintenance task definitions. In turn, this feedback is preferably sent back to the data module 124 such that the maintenance task definitions, and/or the underlying maintenance point data and/or global task templates, are updated with the latest completion date and any other data, such as, for example, feedback, task information, maintenance point information, unusual or dangerous conditions, conditions requiring further attention, and/or the like.

Where possible, conditions requiring further attention are preferably reported via standardized pick lists, such as, for example, generated automatically via the progression through the troubleshooting guide. These can be directly linked to other, usually conditional (not interval) tasks, such that the conditional, e.g., corrective, tasks are made due. Alternately, these conditions may force the due date for a recurring interval task to be made more immediate. Users may also select, via configuration, that the new tasks be automatically triggered, or may require that another user with higher administrative privileges approve the action before it is triggered. Other observations may only be for advisory, informational, or historical purposes.

In the preferred embodiment, a route plan is preferably applied in step 148 on a periodic basis, such as daily, weekly, or the like, to generate an assignment, and the assignment preferably thrown away at the end of its useful life. For example, a daily route plan is preferably applied anew to generate assignments on a daily basis with each assignment thrown away, reset, or otherwise disposed of, at the end of its respective day. In this way, the system 10 may continuously re-balance the workload and generate new route plans from the most current data available, such that urgencies, priorities, and the like that may change are taken into account in the generation of new assignments so as to maximize efficiency and ensure that the most important maintenance tasks are moved to the top of subsequent assignments. Rebalancing the workload is preferably accomplished by time shifting within the due-date or on-time tolerance and, in some cases, beyond, such as by prioritizing work (urgency, efficiency or timeliness) within the confining limitations of manpower, tool availability and other constraining factors.

Other factors that are likely to change, though generally more slowly and/or less frequently, may include: criticalities, lubricants in use, task intervals, and the tasks to be performed themselves. Whole machines may also periodically be added and removed. It should be noted that it is preferably the results of the query that will change, and indirectly effect assignments because the data being queried has changed. This is one particular advantage of the present system 10 and method 120, in that prior art systems generally pre-calculate and store derived data, makings such prior art systems both more complicated, as well as less flexible and less capable.

In other embodiments, assignments may be saved for historical purposes. Assignments may also be turned into route plans for future reuse (however it is preferably the assignment's corresponding dynamic query representation that is retained, and thus the procedures actually included at any time in the future will generally be different due to the application of the underlying query and/or queries to current data underlying the various maintenance task definitions that are due at a given time. This is one major difference between the route plans and assignments of the present invention and more traditional routes that are grouped by interval. Specifically, the fact that route plans are grouped dynamically depending on criticalities, optimal due date and corresponding windows, gives the route plans of the present invention an advantage in overall execution efficiency.

The system 10 preferably further includes some form of feedback mechanism, such as in step 156 (FIG. 4), such that completed tasks are indicated as such, for example, so that completed tasks are not included in future route plans to prevent duplication. Additionally, the actual completion date is preferably used for scheduling the next completion of a periodic maintenance task to ensure maximum efficiency of work by only performing work on as-actually-needed basis.

Referring now to FIG. 14, an exemplary screen or form is shown having means for a technician to provided feedback as to the maintenance tasks included in the assignment. In the preferred embodiment, the feedback is provided in the form of default answers. Specifically, the default value for "COMPLETE" is "NOT ATTEMPTED" (represented as an unchecked box), such that if a maintenance technician does not specifically indicate that a task was completed, it is presumed that it was not attempted. However, where a technician indicates that a task was completed, the system 10 registers the completion date scheduled in the route plan. In the system 10 and method 120 of the present invention, the design of both allows for left over work to be effectively tracked and efficiently included in a future assignment. Other options that may be included are "complete" and "could not be completed". Additionally, a user may indicate that review by an engineer or engineering department is desired and/or required. This status information may also preferably be supplemented by coded feedback notes, collected values and observations, and optionally, free-form text notes.

Such feedback is provided in the predefined or other recognizable format, a user and/or system implementing the method 120 may automatically apply that feedback to the system to improve the accuracy and/or reliability of future route plans.

For example, where a technician indicates that a task could not be completed, the system 10 may increase the estimated task length for the global task template corresponding to the maintenance task definition, or may add additional time to the specific task definition, depending on whether the additional time was necessitated by the task itself or was due to individual characteristics at a specific maintenance point. For example, where feedback patterns are for the same task template across all maintenance points, the task length in the global task template will preferably be increased; and where feedback patterns correspond to a specific maintenance point, then an additional time indicator will preferably be added to the maintenance task definition corresponding to the specific maintenance point More specifically, time series data or repetitive observations may prompt for temporary of permanent changes in the execution schedule of tasks (which is easily handled because assignments are generated from queries and route plans, thus such changes do not need to be avoided as they must be in conventional route systems). For example, a twice-monthly inspection that frequently notes a low oil level may prompt at each such event a near term action of an on condition top up task. Long term, it may prompt a scope element to be added to its next rebuilt to investigate and repair the source of leakage. In the intermediate term, however, it is advisable to increase the frequency with which the inspection is done. Where feedback is not sufficiently recognizable to be automatically or semi-automatically considered, it is preferably stored and/or forwarded for individualized review, for example, by a maintenance manager and/or engineer.

Additionally, the "NO" response or value in the "COMPLETED?" column indicates to a user and/or system implementing the method 120 that the task was not completed and that the corresponding maintenance task definition should not be updated with the current completion date, such that the next time a route plan is generated, the maintenance task definition will still be due and may be included in future route plans within which the task definition coincides.

Any number of queries and/or route plans may be successively, sequentially, or otherwise applied to generate any desired number and/or variety of assignments. As such, it should be understood that any and or all of the foregoing may be expanded, supplemented, replaced, renamed, reconfigured, and/or the like, in accordance with the present invention in order to adapt and apply the method 120 to any suitable facility and/or assets.

As mentioned above, the association of maintenance points with task templates will often be done manually. As such, one preferred embodiment of a business method for enabling a customer to practice and/or implement the various methods and steps described herein includes associating and/or identifying a plurality of associations between a plurality of maintenance points and a plurality of task templates to generate, or enable the generation of, a plurality of maintenance task definitions defined by the association of maintenance points and task templates. At least one maintenance task definition is preferably defined by the association of a maintenance point having a plurality of maintenance point parameters and a task template having a plurality of task parameters.

The business method preferably further includes providing instructions to the customer for accessing data stored on or more storage media, wherein the stored data is preferably indicative of the plurality of maintenance task definitions, the plurality of maintenance points, and the plurality of task templates. The stored data is preferably such that upon accessing at least one maintenance task definition, such maintenance task definition is dynamically generated from the plurality of maintenance point parameters of the at least one maintenance point and from the plurality of task parameters of the at least one task template. The instructions are preferably further for applying a query to the stored data to generate an assignment including selected maintenance task definitions matching the query. Such query preferably has a plurality of filter criteria and a plurality of logical relationships defined between the filter criteria to selectively include maintenance task definitions matching the query and exclude maintenance task definitions not matching the query. The instructions are preferably further for outputting the generated assignment.

In one embodiment of the business method, the instructions are preferably further for selecting a plurality of filter criteria and a plurality of logical relationships between the filter criteria to define one or more queries corresponding to one or more parameters associated with one or more maintenance task definitions to be selectively included or excluded by the one or more queries; as well as for storing the one or more queries. Additionally, various embodiments of the business method may include providing the instructions in any form described herein, such as software and/or any embodiments or forms thereof.

In another preferred embodiment of the business method, some or all of the data used and/or stored and/or accessed by a user and/or system implementing the various methods and/or steps described herein is stored and/or maintained remotely, and accessed by the system and/or user associated with or authorized for the customer, such as, via the internet or other network. In such embodiment, a periodic fee is preferably charged to the customer for access and/or use of such data.

From the above description, it is clear that the present invention is well adapted to carry out the objects and to attain the advantages mentioned herein, as well as those inherent in the invention. While presently preferred embodiments of the invention have been described for purposes of this disclosure, it will be understood that numerous changes my be made which will readily suggest themselves to those skilled in the art and which are accomplished in the spirit of the invention disclosed and as defined in the appended claims.

What is claimed is:

1. A system for scheduling a plurality of selected user performable maintenance tasks, comprising:
    one or more storage media storing data indicative of a plurality of maintenance points, a plurality of task templates, and a plurality of maintenance task definitions as associations between maintenance points and task templates, two or more maintenance points having a plurality of maintenance point parameters and are each associated with at least one task template having a plurality of task parameters, such that upon any of the two or more maintenance task definitions being accessed, such maintenance task definition is dynamically generated from the plurality of maintenance point parameters of the at least one maintenance point and from the plurality of task parameters of the at least one task template;
    a processor selectively applying one or more queries to the stored data to generate a user perceivable assignment including one or more selected user performable maintenance tasks, the one or more queries having a plurality of filter criteria and a plurality of logical relationships defined between the filter criteria to selectively include maintenance task definitions matching the one or more queries and exclude maintenance task definitions not matching the one or more queries; and
    at least one means for outputting the assignment to a user, in a user perceivable format.

2. The system of claim 1, wherein one or more of the task templates are globally-defined, such that changes to the one or more globally-defined task templates are reflected in all of the maintenance task definitions associated with the respective globally-defined task templates.

3. The system of claim 1, further comprising:
    one or more means for permitting a user to selectively define one or more queries by selecting a plurality of filter criteria and a plurality of logical relationships between the filter criteria,
        the one or more queries corresponding to one or more parameters associated with one or more maintenance task definitions to be selectively included or excluded by the one or more queries;
        and for permitting the user to selectively store the one or more queries to be selectively accessible.

4. The system of claim 1, wherein at least a portion of the plurality of maintenance point parameters are associated with the at least one maintenance point in a hierarchical fashion, and wherein the plurality of task parameters are associated with the at least one task template in an hierarchical fashion.

5. The system of claim 1, wherein at least one of the one or more queries includes a virtual hierarchy.

* * * * *